United States Patent
Elsherif et al.

(10) Patent No.: US 12,526,654 B2
(45) Date of Patent: Jan. 13, 2026

(54) TRIGGER CONDITIONS FOR SWITCHING SERVICE INTERVALS AND SERVICE PERIODS

(71) Applicant: QUALCOMM Incorporated, San Diego, CA (US)

(72) Inventors: Ahmed Ragab Elsherif, San Jose, CA (US); Rong He, San Diego, CA (US); Laurent Wojcieszak, Belfast (GB); Srikant Kuppa, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/306,736

(22) Filed: Apr. 25, 2023

(65) Prior Publication Data

US 2024/0114356 A1    Apr. 4, 2024

Related U.S. Application Data

(60) Provisional application No. 63/378,346, filed on Oct. 4, 2022.

(51) Int. Cl.
*H04W 24/02* (2009.01)
*H04W 84/18* (2009.01)

(52) U.S. Cl.
CPC ........... *H04W 24/02* (2013.01); *H04W 84/18* (2013.01)

(58) Field of Classification Search
CPC . H04W 24/02; H04W 84/18; H04W 28/0268; H04W 28/02; H04W 72/12; H04L 43/0858; H04L 43/16; Y02D 30/70
See application file for complete search history.

(56) References Cited

U.S. PATENT DOCUMENTS

| | | |
|---|---|---|
| 10,517,106 B1 | 12/2019 | Wang et al. |
| 2018/0295573 A1* | 10/2018 | Gidvani ............ H04W 52/0229 |
| 2019/0053155 A1 | 2/2019 | Kneckt et al. |
| 2019/0075521 A1* | 3/2019 | Kneckt ............ H04W 52/0229 |
| 2019/0104423 A1 | 4/2019 | Hariharan et al. |

(Continued)

OTHER PUBLICATIONS

Chen Q., et al., "A Target Wake Time based Power Conservation Scheme for Maximizing Throughput in IEEE 802.11ax WLANs", IEEE 25th International Conference on Parallel and Distributed Systems (ICPADS), 2019, pp. 217-224.

(Continued)

*Primary Examiner* — Cindy Trandai
(74) *Attorney, Agent, or Firm* — Harrity & Harrity, LLP

(57) ABSTRACT

Various aspects of the present disclosure generally relate to wireless communication. In some aspects, a wireless communication device (WCD) may communicate, during a first communication period, with an audio device via a wireless link configured with a first service interval and a first service period. The WCD may communicate, during a second communication period, with the audio device via the wireless link configured with a second service interval and a second service period based at least in part on detection of a trigger condition comprising one or more of: a change of a signal strength, a change of one or more concurrent wireless links on one or more frequency bands that overlap with the wireless link, a change of a use state of the WCD, or a change in channel congestion or interference. Numerous other aspects are described.

30 Claims, 9 Drawing Sheets

(56) References Cited

U.S. PATENT DOCUMENTS

| | | | |
|---|---|---|---|
| 2019/0158385 A1* | 5/2019 | Patil | H04W 76/15 |
| 2019/0246221 A1* | 8/2019 | Shariati | H04N 21/00 |
| 2019/0253967 A1 | 8/2019 | Xiao et al. | |
| 2019/0306790 A1* | 10/2019 | Kottontavida | H04W 72/52 |
| 2020/0267644 A1* | 8/2020 | Rajib | H04W 52/0216 |
| 2021/0058862 A1* | 2/2021 | Choo | H04L 5/1469 |
| 2021/0281991 A1 | 9/2021 | Chen et al. | |
| 2021/0410089 A1* | 12/2021 | Choi | H04W 74/0808 |
| 2022/0095311 A1 | 3/2022 | Kondareddy et al. | |
| 2022/0141680 A1* | 5/2022 | Min | H04W 28/02 |
| 2022/0182935 A1* | 6/2022 | Hu | H04W 52/0248 |
| 2022/0217630 A1* | 7/2022 | Chen | H04W 74/0816 |
| 2022/0279516 A1 | 9/2022 | Kurian et al. | |
| 2022/0315027 A1* | 10/2022 | Behring | B60K 35/00 |
| 2022/0343829 A1* | 10/2022 | Min | G06F 3/14 |
| 2022/0416989 A1* | 12/2022 | Lee | H04W 48/10 |
| 2023/0026249 A1* | 1/2023 | Chu | H04W 28/0268 |
| 2024/0008086 A1* | 1/2024 | Xin | H04W 74/0816 |

OTHER PUBLICATIONS

International Search Report and Written Opinion—PCT/US2023/073625—ISA/EPO—Dec. 5, 2023.

* cited by examiner

US 12,526,654 B2

TRIGGER CONDITIONS FOR SWITCHING SERVICE INTERVALS AND SERVICE PERIODS

CROSS-REFERENCE TO RELATED APPLICATION

This Patent Application claims priority to U.S. Provisional Patent Application No. 63/378,346, filed on Oct. 4, 2022, entitled "TRIGGER CONDITIONS FOR SWITCHING SERVICE INTERVALS AND SERVICE PERIODS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for trigger conditions for switching service intervals and service periods.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. "Downlink" may refer to the communication link from the AP to the station, and "uplink" may refer to the communication link from the station to the AP.

The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (WPAN), which may include a Bluetooth connection, may provide for short range wireless connections between two or more paired wireless devices. For example, wireless devices such as cellular phones may utilize WPAN communications to exchange information such as audio signals with wireless headsets.

SUMMARY

Some aspects described herein relate to a method of wireless communication performed by a wireless communication device (WCD). The method may include communicating, during a first communication period, with an audio device via a wireless link, the wireless link configured with a first service interval and a first service period. The method may include communicating, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to a method of wireless communication performed by an audio device. The method may include communicating, during a first communication period, with a WCD via a wireless link, the wireless link configured with a first service interval and a first service period. The method may include communicating, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to a WCD for wireless communication. The wireless communication device may include a memory and one or more processors coupled to the memory. The one or more processors may be configured to communicate, during a first communication period, with an audio device via a wireless link, the wireless link configured with a first service interval and a first service period. The one or more processors may be configured to communicate, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to an audio device for wireless communication. The audio device may include a memory and one or more processors coupled to the memory. The one or more processors may be configured to communicate, during a first communication period, with a WCD via a wireless link, the wireless link configured with a first service interval and a first service period. The one or more processors may be configured to communicate, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to a non-transitory computer-readable medium that stores a set of instructions for wireless communication by a WCD. The set of instructions, when executed by one or more processors of the WCD, may cause the WCD to communicate, during a first communication period, with an audio device via a wireless link, the wireless link configured with a first service interval and a first service period. The set of instructions, when executed by one or more processors of the WCD, may cause the WCD to communicate, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to a non-transitory computer-readable medium that stores a set of instructions for wireless communication by a one or more instructions that, when executed by one or more processors of an audio device. The set of instructions, when executed by one or more processors of the one or more instructions that, when executed by one or more processors of an audio device, may cause the one or more instructions that, when executed by one or more processors of an audio device to communicate, during a first communication period, with a WCD via a wireless link, the wireless link configured with a first service interval and a first service period. The set of instructions, when executed by one or more processors of the one or more instructions that, when executed by one or more processors of an audio device, may cause the one or more instructions that, when executed by one or more processors of an audio device to communicate, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to an apparatus for wireless communication. The apparatus may include means for communicating, during a first communication period, with an audio device via a wireless link, the wireless link configured with a first service interval and a first service period. The apparatus may include means for communicating, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the WCD, or a change in channel congestion or interference.

Some aspects described herein relate to an apparatus for wireless communication. The apparatus may include means for communicating, during a first communication period, with a WCD via a wireless link, the wireless link configured with a first service interval and a first service period. The apparatus may include means for communicating, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of, a change of a signal strength, a change of one or more concurrent wireless links on one or more frequency bands that overlap with the wireless link, a change of a use state of the apparatus, or a change in channel congestion or interference.

Aspects generally include a method, apparatus, system, computer program product, non-transitory computer-readable medium, user equipment, base station, network entity, network node, wireless communication device, and/or processing system as substantially described herein with reference to and as illustrated by the drawings, and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
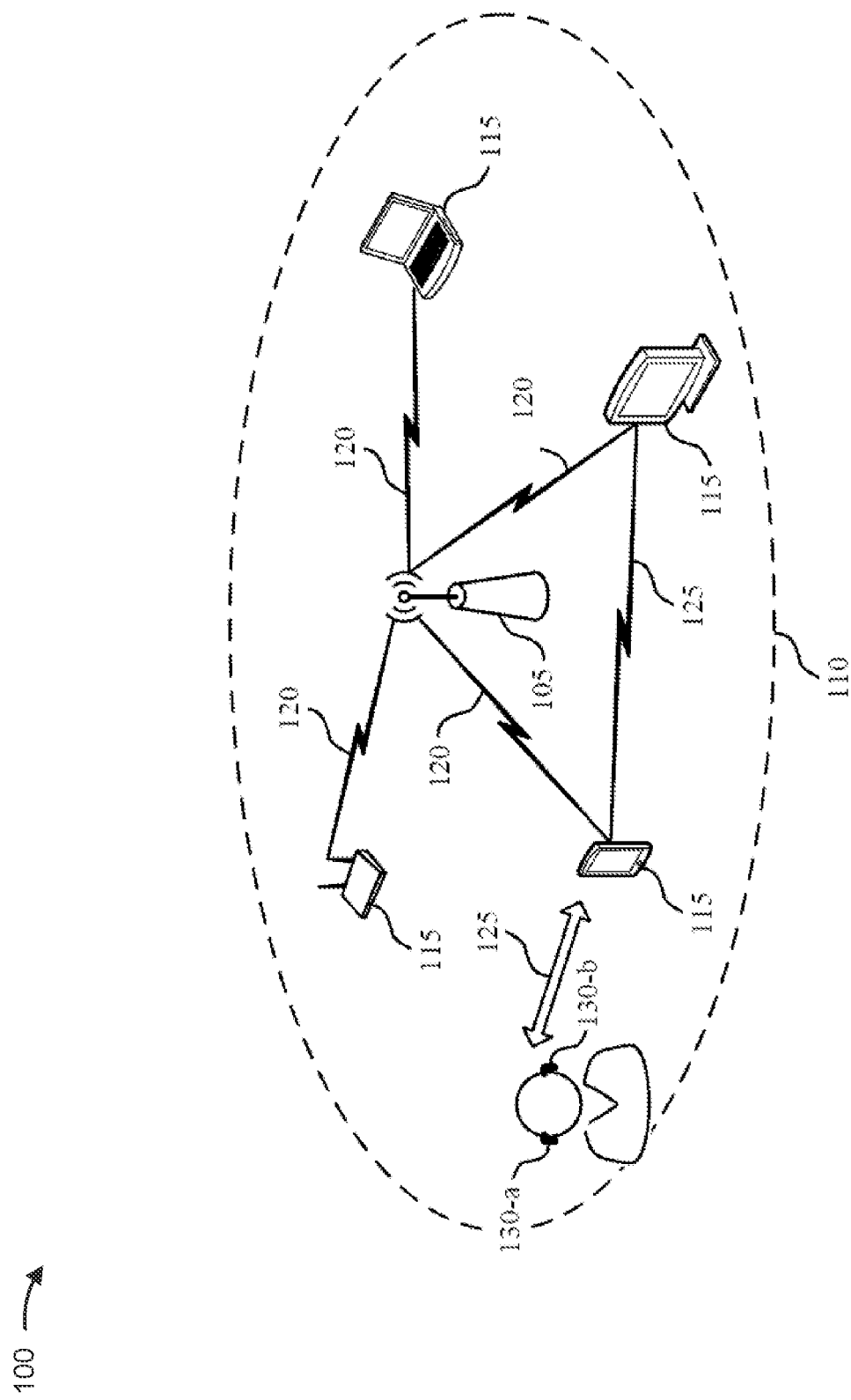
FIG. 1 illustrates a wireless communication system configured in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

In some networks, a wireless communication device (WCD) may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (e.g., peripheral devices) of a user. In scenarios in which a user uses two peripheral devices, the wireless communication device may support an extended personal audio network (XPAN) via which the wireless communication device may communicate with the two peripheral devices. To meet latency or lossless criteria associated with an application or use case, XPAN devices may employ a target wake time (TWT) technique for communication between the wireless communication device and the peripheral devices. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a wireless communication device (WCD), which may be a handset or an access point (AP) (e.g., a soft AP (SAP)), and a set of peripheral devices (e.g., earbuds or audio devices) may use downlink audio data packets to carry updated TWT parameters or any other XPAN-related parameters that the wireless communication device and the peripheral devices may indicate via wireless signaling. Additionally, or alternatively, the wireless communication device may embed a set of updated parameters in a padding section of an audio data packet and may transmit the audio data packet to the peripheral devices. The peripheral devices may each acknowledge the audio data packet transmitted by the wireless communication device, and the wireless communication device may communicate in accordance with the updated parameters based on receiving acknowledgements from each of the peripheral devices.

FIG. 1 illustrates a wireless communication system 100 (also known as a wireless local area network (WLAN) or a Wi-Fi network) configured in accordance with the present disclosure. The wireless communication system 100 may include an AP 105 and multiple associated devices 115 (such as stations (STAs) or SAPs), which may represent devices such as mobile stations, personal digital assistants (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a basic service set (BSS) or an extended service set (ESS). The various devices 115 in the network are able to communicate with one another through the AP 105. Also shown is a coverage area 110 of the AP 105, which may represent a basic service area (BSA) of the wireless communication system 100. An extended network station (not shown) associated with the wireless communication system 100 may be connected to a wired or wireless distribution system that may allow multiple APs 105 to be connected in an ESS.

Although not shown in FIG. 1, a device 115 may be located in the intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections. Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention-based environment (e.g., carrier sense multiple access with collision avoidance (CSMA/CA)) because the devices 115 may not refrain from transmitting on top of each other. A device 115 whose transmissions are not identifiable, but that is within the same coverage area 110 may be known as a hidden node. CSMA/CA may be supplemented by the exchange of a request-to-send (RTS) packet transmitted by a sending device 115 (or AP 105) and a clear-to-send (CTS) packet transmitted by the receiving device 115 (or AP 105). This may alert other devices within range of the sender and receiver not to transmit for the duration of the primary transmission. Thus, RTS and/or CTS may help mitigate a hidden node problem.

The wireless communication system 100 may include an AP 105, devices 115 (e.g., which may be referred to as source devices or central devices), and paired devices 115 (e.g., which may be referred to as sink devices or peripheral devices) implementing WLAN communications (e.g., Wi-Fi communications) and/or Bluetooth communications. For example, devices 115 may include cell phones, user equipment (UEs), STAs, mobile stations, PDAs, other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc.

"Bluetooth communications" may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communication system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, "device 115" may generally refer to a central device, and "paired device 115" may refer to a peripheral device in the wireless communication system 100. Therefore, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communication system 100. Generally, "device 115" may refer to a wireless communication device capable of wirelessly exchanging data signals with another device (e.g., a paired device 115), and "paired device 115" may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profiles). The controller stack may be responsible for setting up communication links 125, such as asynchronous connection-oriented links (or asynchronous connection-oriented connections), synchronous connection-orientated (SCO) links (or SCO connections), extended synchronous connection-oriented (eSCO) links (or eSCO connections), other logical transport channel links, etc. For example, a Bluetooth connection may be an eSCO connection for voice calls (e.g., which may allow for retransmission), an asynchronous connection-less (ACL) connection for music streaming (e.g., advanced audio distribution profile (A2DP)), etc. eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged and may be retransmitted if not acknowledged during a retransmission window. In addition, audio may be streamed between a device 115 and a paired device 115 using an ACL connection (e.g., an A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device (HID) profile (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a BSS or an ESS. The various devices 115 in the network may be able to communicate with one another through the AP 105. In some cases the AP 105 may be associated with a coverage area, which may represent a BSA.

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi TDLS links, peer-to-peer communication links, or other peer or group connections). AP 105 may be coupled to a network (such as the Internet) and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have a higher priority than WLAN traffic.

In some deployments, a wireless communication device may support applications associated with low-latency or lossless audio to one or more other devices, such as one or more personal audio devices. For example, a wireless communication device may support applications and use cases associated with ULL, such as ULL gaming, or streaming lossless audio to one or more personal audio devices (e.g., peripheral devices) of a user. In scenarios in which a user uses two peripheral devices (e.g., a wireless earbud 130-*a* and a wireless earbud 130-*b*), the wireless communication device may support an XPAN via which the wireless communication device may communicate with the two peripheral devices.

To meet latency or lossless criteria associated with an application or use case, XPAN devices may employ a TWT technique for communication between the wireless communication device and the peripheral devices. Initial or default TWT parameters may be set under an expectation for ideal (e.g., interference-free or approximately interference-free) conditions and may be updated in response to changing channel conditions or a changing concurrency situation at the wireless communication device. In some systems, the peripheral devices and the wireless communication device may exchange one or more Bluetooth messages and implement a complete TWT teardown between the wireless communication device and each of the peripheral devices. Such an exchange of Bluetooth messages and TWT teardown may introduce too much latency for some applications, such as ULL gaming or streaming lossless audio applications.

In some implementations, a wireless communication device, which may be a device 115 (e.g., a handset) or an AP 105, and a set of peripheral devices may use downlink audio data packets to carry updated TWT parameters or any other XPAN-related parameters that the wireless communication device and the peripheral devices may indicate via wireless signaling.

Figure 2:
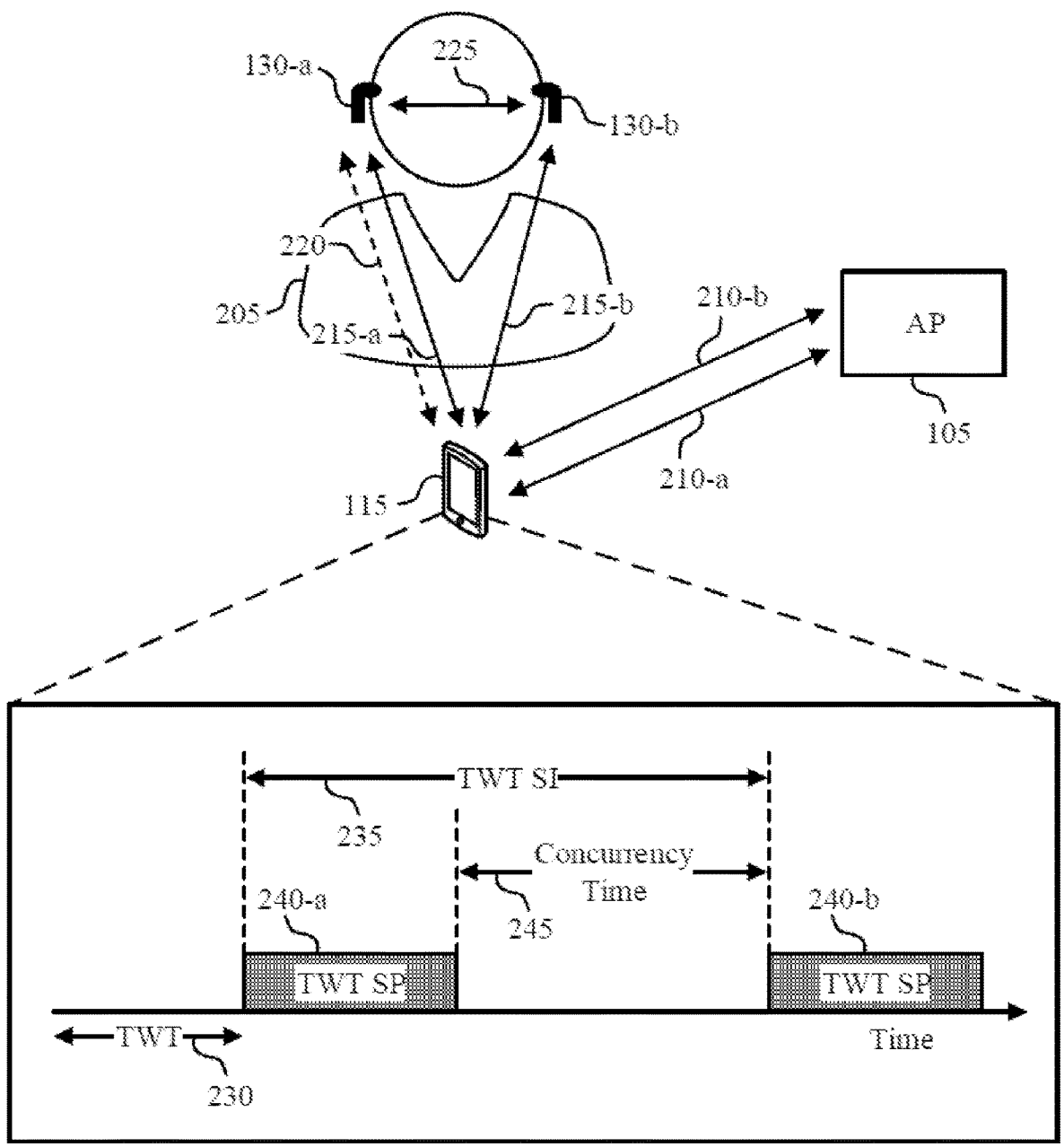
FIG. 2 illustrates an example of a wireless communication system that supports low-latency parameter updates for extended personal audio networks in accordance with the present disclosure.

FIG. 2 illustrates an example of a wireless communication system 200 that supports low-latency parameter updates for extended personal audio networks in accordance with the present disclosure. The wireless communication system 200 may implement or be implemented to realize aspects of the wireless communication system 100. For example, the wireless communication system 200 illustrates communication between an AP 105, a device 115 (e.g., a handset or handheld device), and a wireless earbud 130-*a* and a wireless earbud 130-*b* of a user 205 (e.g., examples of audio devices and/or peripheral devices), which may be examples of corresponding devices as illustrated by and described with reference to FIG. 1. In some implementations, the device 115, the wireless earbud 130-*a*, and the wireless earbud 130-*b* may support a signaling-based mechanism according to which the device 115 may transmit an indication of a set of updated parameters to each of the wireless earbud 130-*a* and the wireless earbud 130-*b* via one or more audio data packets.

In some deployments, the device 115 may communicate with the AP 105 via one or both of a link 210-*a* and a link 210-*b*, which may be examples of infrastructure links between the AP 105 and the device 115. The link 210-*a* may be an example of a 2.4 GHz link between the AP 105 and the device 115, and the link 210-*b* may be an example of a 5 GHz link or a 6 GHz link between the AP 105 and the device 115. Further, the device 115 may communicate wirelessly with each of the wireless earbud 130-*a* and the wireless earbud 130-*b*, where each of the wireless earbud 130-*a* and the wireless earbud 130-*b* may be associated with an XPAN of the device 115. For example, the device 115 may communicate with the wireless earbud 130-*a* via a link 215-*a* and may communicate with the wireless earbud 130-*b* via a link 215-*b*, where the link 215-*a* and the link 215-*b* may be referred to or understood as XPAN links. The link 215-*a* may be an example of a 5 GHz link or a 6 GHz link and the link 215-*b* may be an example of a 5 GHz link or a 6 GHz link. Additionally, in some examples, the device 115 may communicate with the wireless earbud 130-*a*, which may be an example of a primary earbud, via a communication link 220. The communication link 220 may be an example of a Bluetooth link between the device 115 and the wireless earbud 130-*a*. The wireless earbud 130-*a* and the wireless earbud 130-*b*, which may be an example of a secondary earbud, may communicate with each other via a link 225, which may be an example of a Bluetooth link between the wireless earbud 130-*a* and the wireless earbud 130-*b*.

In some cases, the device 115, the wireless earbud 130-*a*, and the wireless earbud 130-*b* may support or belong to an XPAN and may use the XPAN to support one or more applications or use cases, such as applications or use cases associated with latency or lossless audio constraints or criteria. For example, the device 115 may support one or more use cases of ULL gaming and streaming lossless audio to the wireless earbud 130-*a* and the wireless earbud 130-*b* (e.g., personal devices of the device 115). For such applications, the device 115 may be expected to keep end-to-end latency below a relatively stringent latency target (e.g., 40 ms for ULL gaming). Further, the device 115 may also be tasked with handling a coexistence of XPAN traffic (e.g., traffic to or from one or both of the wireless earbud 130-*a* and the wireless earbud 130-b) with other concurrency scenarios the user 205 or the system may initiate. Such other concurrency scenarios may include an STA infrastructure link concurrency for online gaming or other traffic to or from the AP 105, or neighbor aware networking (NAN) discovery and NAN data transfer, peer to peer (P2P) concurrency to another device, or any combination thereof.

The device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless earbud 130-a and the wireless earbud 130-b, and/or power and concurrency constraints at the device 115, the device 115 may employ a TWT technique for the communication between the device 115 (which may act or function as an SAP) and each of the wireless earbud 130-a and wireless earbud 130-b (which may act or function as STAs).

Example TWT parameters include a TWT 230, a TWT service interval (SI) 235, and a TWT service period (SP) 240. A TWT 230 may indicate or be associated with a timing synchronization function (TSF) time indicating a start or beginning of a first TWT session. A TWT SI 235 may indicate a TWT interval, which may refer to a time difference between a start or beginning of two consecutive TWT sessions. A TWT SP 240 may indicate a duration during which one or both of the wireless earbud 130-a and the wireless earbud 130-b are awake during a TWT SI 235. In some aspects, a TWT SP 240 may be referred to or understood as a TWT session. As illustrated by FIG. 2, the TWT SI 235 may indicate a time difference between a TWT SP 240-a and a TWT SP 240-b. A remainder of time within a TWT SI 235 excluding a TWT SP 240 may be referred to or understood as a concurrency time 245 during which the device 115 may perform any operations (e.g., transmission or reception) associated with a concurrency scenario at the device 115 (e.g., communications via additional wireless links). In other words, the difference between XPAN TWT SI 235 and XPAN TWT SP 240 may be the time left for the device 115 to support other concurrencies (e.g., in addition to any channel switching or software overheads).

For XPAN, each of the wireless earbud 130-a and the wireless earbud 130-b (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

In some cases, a default or initial set of TWT parameters for XPAN may be configured or set expecting ideal (e.g., interference-free or approximately interference-free) conditions (e.g., link conditions, channel conditions, or environmental conditions). In some deployments, Wi-Fi channel conditions, a concurrency situation of the device 115, or XPAN constraints may change over time. Such changes may trigger, be associated with, or mandate a TWT parameter update. Further, in applications or use cases associated with low latency (e.g., ULL gaming and streaming lossless audio), the TWT parameter update may be expected to be performed with low latency to continue to meet XPAN constraints without compromising a user experience. As an example, for XPAN gaming use cases, a TWT SP 240 may be approximately 2 ms. A communication overhead of the updated TWT parameters, or other information communicated from the device 115 to the wireless earbud 130-a and the wireless earbud 130-b, may also be expected to be relatively small.

In some systems, however, a TWT parameter update procedure may be associated with a relatively high latency. Further, because TWT sessions may be initiated by the wireless earbud 130-a and the wireless earbud 130-b (with default or initial parameters), any update for TWT parameters triggered by a condition change on the device 115 may involve the device 115 transmitting the updated parameters to the wireless earbud 130-a and the wireless earbud 130-b followed by a TWT parameter change at the wireless earbud 130-a and the wireless earbud 130-b.

An example TWT parameter update procedure may include a sequence of signaling steps that involve one or more transmissions using a Bluetooth link, which may introduce relatively large delays. For example, a Wi-Fi sub-system (SS) of the device 115 may send, to a Bluetooth host (BT host) of the device 115, a request (e.g., a TWT parameter update request) to update one or more TWT parameters after one or more conditions are detected that trigger one or more TWT parameter changes. The BT host of the device 115 may communicate an updated set of TWT parameters to a BT host of a primary earbud (e.g., the wireless earbud 130-a) using a Bluetooth link. Such an updated TWT configuration sent via a Bluetooth link may add approximately 80 ms of delay. The BT host of the primary earbud may signal the new TWT parameters internally to a Wi-Fi SS of the primary earbud, and the BT host of the primary earbud may communicate the new TWT parameters to a BT host of a secondary earbud (e.g., the wireless earbud 130-b) using a Bluetooth link. Such an indication of a TWT configuration via a Bluetooth link between the primary earbud and the secondary earbud may add approximately 120 ms of delay. The BT host of the secondary earbud may signal the new TWT parameters internally to a Wi-Fi SS of the secondary earbud.

The Wi-Fi SS of the primary earbud may start a TWT session teardown and parameter update process. The TWT session teardown and parameter update process may involve a transmission, from the Wi-Fi SS of the primary earbud to the Wi-Fi SS of the device 115 via an XPAN Wi-Fi link, of a TWT Teardown message and a TWT Request message that carries the new TWT parameters and a transmission, from the Wi-Fi SS of the device 115 to the Wi-Fi SS of the primary earbud via the XPAN Wi-Fi link, of an acknowledgement (ACK) of the new TWT parameters with a TWT Response message. The Wi-Fi SS of the device 115 may update the BT host of the device 115 that a new TWT session with the primary earbud has been established (e.g., the Wi-Fi SS may indicate a TWT session update to the BT host). Such a TWT session teardown and parameter update process may additionally be performed between the device 115 and the secondary earbud.

In accordance with such a TWT parameter update procedure, the device 115 may incur a relatively large delay between the time that a condition is triggered on the device 115 associated with a TWT parameter update and the time that the updated parameters take effect. For example, some components of the delay may include a delay of approximately 80 ms associated with the updated TWT configuration sent via the Bluetooth link between the device 115 and the primary earbud, a delay of approximately 100 ms associated with a sniff exit delay if the Bluetooth link between the two earbuds is in sniff mode, a delay of approximately 20 ms associated with the updated TWT configuration sent via the Bluetooth link between the two earbuds, and a delay of approximately 5 ms associated with the teardown of the TWT sessions and the re-establishment of new TWT sessions from both earbuds. Accordingly, such a TWT parameter update procedure may be associated with a total end-to-end delay of approximately 205 ms for a one-time TWT parameter update, which may be too much for some applications or use cases (e.g., ULL gaming and streaming lossless audio use cases).

In some implementations, the device 115, the wireless earbud 130-a, and the wireless earbud 130-b may support a data-packet-generation-based and signaling-based mechanism according to which the device 115 may embed an indication of one or more updated parameters in one or more audio data packets that the device 115 may transmit to the wireless earbud 130-a and the wireless earbud 130-b. For example, if the device 115 detects a change that triggers a parameter update, or if the device 115 otherwise determines to transmit a set of parameters to the wireless earbud 130-a and the wireless earbud 130-b with low latency, the device 115 may embed the parameters in one or more downlink audio data packets and may transmit the one or more downlink audio data packets to the wireless earbud 130-a and the wireless earbud 130-b. In some implementations, the device 115 may transmit an indication of the parameters to the wireless earbud 130-a via a first audio data packet transmitted using a first Wi-Fi link (e.g., a first XPAN Wi-Fi link) and may transmit an indication of the parameters to the wireless earbud 130-b via a second audio data packet transmitted using a second Wi-Fi link (e.g., a second XPAN Wi-Fi link). The first audio data packet and the second audio data packet may include the same information or may include different information, and each may be examples of physical layer convergence protocol (PLCP) protocol data units (PPDUs).

The device 115 may convey a set of one or more parameters to both of the wireless earbud 130-a and the wireless earbud 130-b in the course of expected downlink data transmissions or traffic (e.g., without using any additional or dedicated signaling). In accordance with such a lack of additional over-the-air Bluetooth or Wi-Fi signaling between the device 115 and each of the wireless earbud 130-a and the wireless earbud 130-b, and between the wireless earbud 130-a and the wireless earbud 130-b, a total end-to-end delay may be one or a relatively small quantity of TWT SIs 235, which may correspond to a delay of approximately 4 or 8 ms for some applications or use cases (e.g., ULL gaming). Such a delay of approximately 4 or 8 ms may represent a significant cut down in end-to-end delay of TWT parameter renegotiation compared to other example parameter update procedures (which may incur delays of approximately 205 ms).

The device 115, the wireless earbud 130-a, and the wireless earbud 130-b may achieve up to approximately 50× faster response time to any condition change on an XPAN or infrastructure link associated with the device 115. In other words, the described techniques may allow or facilitate an agile XPAN system that can adapt to changing wireless conditions associated with an XPAN or infrastructure link at the device 115. Accordingly, the described techniques may be applicable to any latency-sensitive applications or use cases using TWT as the communication protocol between potentially power-constrained devices or any other use cases that are associated with or expect low-latency XPAN parameter updates from a default or initial set of programmed values.

Further, the described techniques may allow or facilitate an updating of one or more TWT parameters at the same time and may additionally, or alternatively, be used for communicating any other information (XPAN-related or otherwise) between the device 115, the wireless earbud 130-a, and the wireless earbud 130-b in a fast and efficient way. For examples, the parameters that may be communicated between the device 115 and each of the wireless earbud 130-a and the wireless earbud 130-b may include a set of one or more TWT parameters, a received signal strength indicator (RSSI) measured at either the device 115 or one or both of the wireless earbud 130-a and the wireless earbud 130-b that is expected to be communicated to the device 115 or one or both of the wireless earbud 130-a and the wireless earbud 130-b, a channel switch indication or request, or a bearer switch indication or request. Such one or more TWT parameters may include any one or more of a TWT SI 235, a TWT SP 240, or a TWT start time (e.g., a TWT 230). Further, such a bearer switch indication or request may be a request for a switch from an XPAN bearer to a Bluetooth bearer, or vice versa.

In some networks using XPAN communications, the networks may support ULL gaming with end-to-end latency parameters along with coexistence with concurrency scenarios in which a WCD has wireless links to an audio device and additional devices. To meet the latency requirements for ULL gaming, power requirements of the audio device and power and concurrency requirements on the WCD, a TWT technique may be used for communication between the WCD (e.g., acting as an SAP) and the audio device (e.g., acting as an STA). The TWT may be a TSF time indicating a start of a first TWT session. An SI indicates the TWT interval (e.g., a time difference between a start of two consecutive TWT sessions). An SP indicates a duration the audio device will be awake during an SI. A concurrency time is a difference between the SP and the SI and is a time remaining for the WCD to support the additional concurrencies (e.g., communications via additional wireless links). The faster gaming traffic is successfully delivered between the WCD and the audio device, the more concurrency time that can be achieved on an infrastructure (infra) link of the WCD. For XPAN, each audio device (e.g., a TWT-requesting STA) may initiate a TWT session with the WCD (e.g., a TWT responding STA).

XPAN latency and throughput requirements and handset concurrency requirements may fail to be satisfied met under various changing wireless channel conditions and handset concurrency scenarios. For example, a drop in signal strength of uplink or downlink communications (e.g., as detected by the audio device or the WCD) that may trigger increasing SI to allow for more retransmissions. This may happen based at least in part on phone position change, user covering phone antennas with hands, and/or a user leaving the phone and walking away with the earbuds on, among other examples. In another example, additional concurrency scenarios may be initiated on an infra link of the WCD, which may trigger increasing SI and/or reducing SP to allow for more concurrency time on the WCD. In another example, the WCD may switch between different XPAN use cases with different SI requirements. For example, when the WCD may switch between XPAN ULL Gaming and XPAN Lossless Audio use cases.

In some aspects described herein, an audio device (e.g., earbuds) may initiate a TWT session with a preferred SI (e.g., 4 ms for ULL Gaming or 70 ms for Lossless Audio). Based at least in part on identifying a trigger condition, an SI change may be triggered to meet XPAN parameters or infra link concurrency parameters. A Wi-Fi subsystem of the WCD may communicate an updated SI to a handset audio subsystem (e.g., low power audio subsystem (LPASS)) through a connectivity proxy to adapt audio latency. The handset audio subsystem may communicate to a Wi-Fi subsystem when a latency increase is completed. If a large latency increase is triggered (e.g., more than 2×), a latency increase may be performed in multiple steps (e.g., so that an increased SP still fits with an original SI value before a subsequent step).

The WCD may communicate to the audio device that a new SI is to be used. In some aspects, if the WCD fails to receive an acknowledgement from the audio device, the WCD may re-transmit the updated parameters in a next SI. The audio device may update an SI based at least in part on receiving the new SI.

Based at least in part on switching a service interval and/or a service period based at least in part on a trigger condition, the WCD may support additional wireless connections during the concurrency period, which may reduce collisions of the additional wireless connections and/or may support the WCD to receive data to be used in the wireless link to the audio device.

Figure 3:
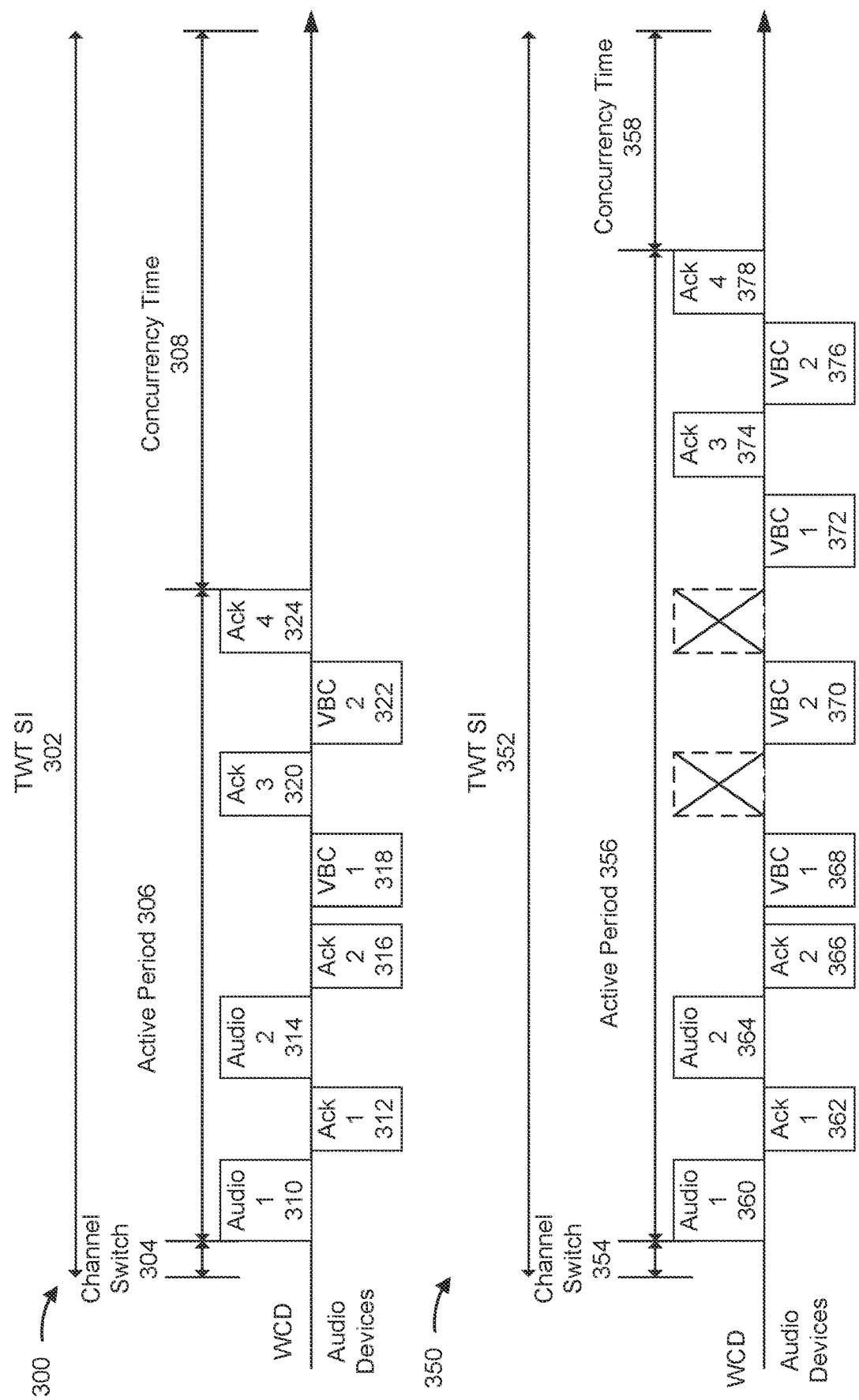
FIG. 3 illustrates examples of target wake time (TWT) packet sequences, in accordance with the present disclosure.

FIG. 3 illustrates examples 300 and 350 of TWT packet sequences, in accordance with the present disclosure. In the context of FIG. 3, a WCD may communicate with one or more audio devices. For example, the WCD may communicate with a first audio device and a second audio device.

As shown in example 300, the WCD may communicate with the one or more audio devices using a TWT technique. The TWT may include a TWT SI 302 associated with a periodicity of TWT communication occasions. The TWT SI 302 may include a channel switch time 304 during which the WCD and/or the one or more audio devices may tune to a channel associated with communicating together. The TWT SI 302 may include an active period 306 during which the WCD and the one or more audio devices exchange communications. The channel switch time 304 and the active period may be included in a TWT SP. After the active period, the TWT SI 302 may include a concurrency time 308 during which the WCD and the audio devices are not scheduled to communicate with each other via a TWT-based communication.

In the example 300, the WCD may transmit a first audio communication (audio 1) 310 to a first audio device. The first audio device may respond with an acknowledgement (ACK 1) 312 to indicate reception of the first audio communication 310. Similarly, the WCD may transmit a second audio communication 314 (audio 2) to a second audio device. The second audio device may respond with an acknowledgment (ACK 2) 316 to indicate reception of the second audio communication 310.

The first audio device may transmit an uplink communication (VBC 1) 318 to the WCD. The WCD may respond with an acknowledgment (ACK 3) 320 to indicate reception of the uplink communication 318. Similarly, the second audio device may transmit an uplink communication (VBC 2) 322 to the WCD. The WCD may respond with an acknowledgment (ACK 4) 324 to indicate reception of the uplink communication 322.

In the example 350, the one or more audio devices may retransmit one or more communications based at least in part on the WCD failing to respond with an ACK to an uplink communication. In example 350, the TWT may include a TWT SI 352 associated with a periodicity of TWT communication occasions. The TWT SI 352 may include a channel switch time 354 during which the WCD and/or the one or more audio devices may tune to a channel associated with communicating together. The TWT SI 352 may include an active period 356 during which the WCD and the one or more audio devices exchange communications. After the active period, the TWT SI 352 may include a concurrency time 358 during which the WCD and the audio devices are not scheduled to communicate with each other via a TWT-based communication.

In the example 350, the WCD may transmit a first audio communication (audio 1) 360 to a first audio device. The first audio device may respond with an acknowledgement (ACK 1) 362 to indicate reception of the first audio communication 360. Similarly, the WCD may transmit a second audio communication 364 (audio 2) to a second audio device. The second audio device may respond with an acknowledgment (ACK 2) 366 to indicate reception of the second audio communication 360.

The first audio device may transmit an uplink communication (VBC 1) 368 (audio 1) to the WCD. The first audio device may fail to receive an acknowledgment to indicate reception of the uplink communication 368. Similarly, the second audio device may transmit an uplink communication (VBC 2) 370 to the WCD. The second audio device may fail to receive an acknowledgment to indicate reception of the uplink communication 370.

Based at least in part on failing to receive an ACK from the WCD, the first audio device and the second audio device may retransmit the first uplink communication 368 and the second uplink communication 370 to the WCD. For example, the first audio device may transmit a retransmission of uplink communication (VBC 1) 372 to the WCD. The WCD may respond with an acknowledgment (ACK 3) 374 to indicate reception of the retransmission of uplink communication 372. Similarly, the second audio device may transmit an retransmission of uplink communication (VBC 2) 376 to the WCD. The WCD may respond with an acknowledgment (ACK 4) 378 to indicate reception of the retransmission of the uplink communication 376.

As shown in FIG. 3, a TWT active period may be longer, and a concurrency time may be shorter, when retransmissions occur.

As indicated above, FIG. 3 is provided as an example. Other examples may differ from what is described with regard to FIG. 3.

In some networks, XPAN latency and throughput requirements and WCD (e.g., handset) concurrency requirements need to be met under various changing wireless channel conditions and handset concurrency scenarios (e.g., additional wireless connections of the WCD). To satisfy the concurrency requirements, TWT SIs and/or TWT SPs may be updated. For example, when an audio-device-to-WCD- or WCD-to-audio-device RSSI drops below a certain threshold, the WCD may desire to increase TWT SI to allow for more retransmissions.

This scenario may occur due to phone position change, a user covering phone antennas with hands, and/or the user leaving the phone and walking away while wearing the audio device, among other examples. Additionally, or alternatively, this scenario may occur when additional concurrency connections are initiated on an Infra link of the WCD, which may require increasing a TWT SI and/or reducing a TWT SP to allow for more concurrency time on the WCD.

In some aspects, the WCD may desire to change the TWT SI or the TWT SP based at least in part on switching between different XPAN use cases with different TWT SI requirements. For example, when switching between XPAN ULL gaming and XPAN lossless audio use cases, the WCD may desire to change the TWT SI or the TWT SP.

In some aspects described herein, a WCD may adjust a TWT SI and/or a TWT SP based at least in part on a trigger condition. For example, based at least in part on an RSSI dropping below a threshold, the WCD may increase a TWT SI and/or increase a TWT SP to allow for more retransmissions. This may provide improved robustness performance in far range communications. Based at least in part on additional concurrencies initiating on an overlapping band on the WCD (e.g., a new P2P, NAN, and/or SAP connection), the WCD may increase a TWT SI and/or reduce a TWT SP. This may allow time resources for additional concurrent connections on the WCD. Based at least in part on switching between XPAN gaming and XPAN high quality (HQ) or another communication mode, the WCD may update the TWT SI and/or TWT SP based at least in part on the communication mode (also referred to as use case). This may provide a seamless transition between communication modes and/or profiles. Based at least in part on detecting channel congestion and/or interference (e.g., within a channel used for communication between the audio device and the WCD), the WCD may increase TWT SI and/or TWT SP to allow for increased retransmissions. This may improve robustness.

In an example of adjusting the TWT SI and/or the TWT SP based at least in part on an RSSI dropping below a threshold, a WCD may monitor RSSI based at least in part on received packets from each connected audio device (e.g., an earbud). For ULL gaming, received packets may include uplink VBC packets and/or ACKs or block ACKs (BAs) from each of the audio devices. For lossless audio, received packets include ACKs and/or BAs from each of the audio devices.

The WCD may calculate and average RSSI (AvgRSSI) as: AvgRSSI_i=α*RSSI_i+(1−α)*AvgRSSI_i, where α is a moving average forgetting factor, RSSI_i is instantaneous RSSI from EB i (earbud i or another audio device), and AvgRSSI_i is average RSSI from EB i.

The WCD may compare an average RSSI metric against a set of configurable thresholds to determine a corresponding TWT SI. For ULL gaming, based at least in part on TWT SI and/or SP being relatively small to meet latency requirements, a same TWT SI, SP, and/or start time may be used for both audio devices.

The WCD may use a minimum RSSI of the two audio devices to map to a TWT SI for both audio devices. $SI_1=SI_2=LUT(\min_i AvgRSSI\_i)$, where $SI_1$ and $SI_2$ are the TWT SIs for the two audio devices and LUT(x) is a look-up table function In an example:

$\min_i AvgRSSI_i > Th_1$, then $SI_1=SI_2=4$ ms $Th_1 < \min_i AvgRSSI_i < Th_2$, then $SI_1=SI_2=8$ ms, etc.

For Lossless Audio, TWT SI and/or SP can be set independently for each audio device based at least in part on the corresponding average RSSI. For example:

$SI\_1=LUT(AvgRSSI_1)$ $SI\_2=LUT(AvgRSSI_2)$

Increased TWT SI may result in increased TWT SP (e.g., for a given audio data rate), allowing for more retransmissions as RSSI drops to maintain the robustness of the XPAN connection.

In another embodiment, the same logic above can be used to adapt a TWT SP with a fixed TWT SI. This also allows for more retransmissions in the same TWT SP and does not increase end-to-end latency, since TWT SI is fixed. This can impact the concurrency time remaining on an Infra link. Choosing to adapt TWT SI vs TWT SP can be based at least in part on the number and/or load of concurrencies on the infra link on the WCD.

For additional concurrencies (e.g., concurrent connections) initiating on an overlapping band (e.g., fully or partially overlapping) on the WCD, the WCD may adjust the TWT SP and/or TWT SI to support concurrency on the Infra link during the non-active XPAN period. The concurrency time C is a net amount of time that can be used on the Infra link. If new connections (e.g., P2P, SAP, NAN) are established on the Infra link, the new connections may require more time (e.g., a larger C)

To achieve a larger concurrency time C, the WCD may increase a TWT SI or decreases a TWT SP. For ULL gaming, decreasing TWT SP may be achieved by reducing a maximum number of retries or lower bounding an modulation and coding scheme (MCS) (e.g., forming a minimum MCS). For lossless audio, decreasing TWT SP may be achieved by increasing audio compression, reducing audio bit rate, and/or moving to lossy audio.

In some aspects, the WCD may account for priorities of the TWT connection and concurrency connections. For example, the WCD may allow a higher TWT SP if a concurrency connection is low priority. Alternatively, the WCD may force a lower TWT SP if a concurrency connection is a high priority.

When switching between XPAN Gaming and XPAN HQ, the WCD may adjust the TWT SI and/or the TWT SP. For example, when switching from XPAN gaming to XPAN HQ, the WCD may increase TWT SI from the XPAN gaming value (e.g., 4 ms) to a lossless audio value (e.g., 70 ms). For example, the WCD may perform this switch if a user is playing an XPAN ULL game and then opens a media application.

When switching from XPAN HQ to XPAN gaming, the WCD may decrease TWT SI from the lossless audio value (e.g., 70 ms) to the XPAN gaming value (e.g., 4 ms). For example, the WCD may perform this switch if a user is listening to an audio stream and then launches a ULL game application.

Figure 4:
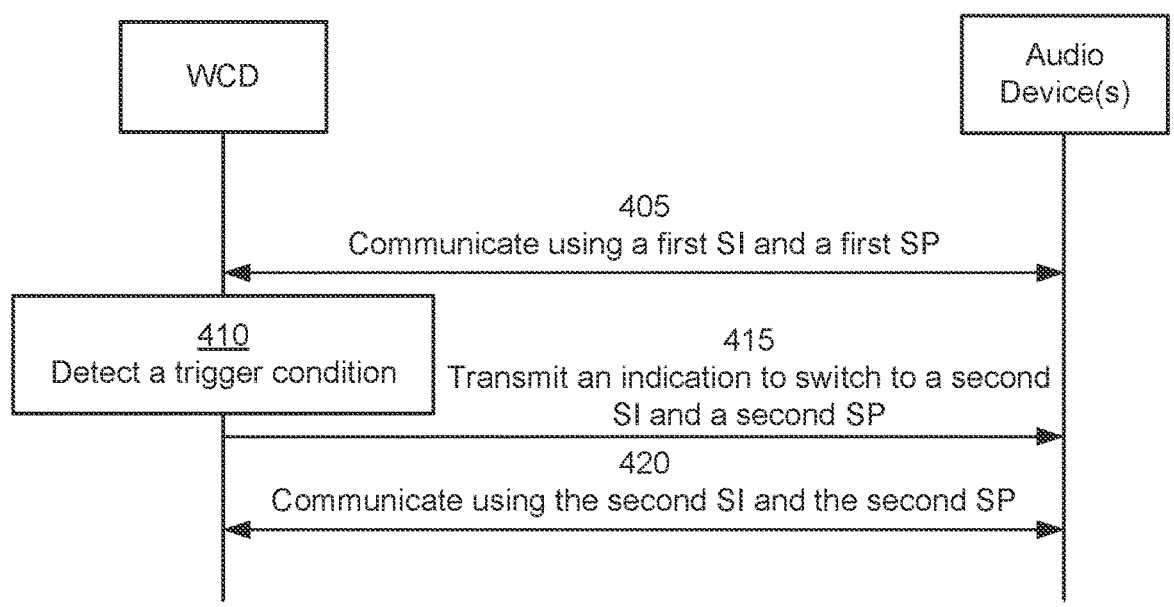
FIG. 4 is a diagram of an example associated with trigger conditions for switching service intervals and service periods, in accordance with the present disclosure.

FIG. 4 is a diagram of an example 400 associated with trigger conditions for switching service intervals and service periods (e.g., associated with TWT communications), in accordance with the present disclosure. As shown in FIG. 4, a WCD (e.g., a STA, a handset, a UE, or host device, among other examples) may communicate with one or more audio devices (e.g., earbuds). In some aspects, the WCD and the one or more audio devices may have established a wireless connection prior to operations shown in FIG. 4.

As shown by reference number 405, the WCD and the one or more audio devices may communicate using a first SI and a first SP. The first SI and the first SP may be part of a first configuration for TWT communication. The first configuration may be associated with a set of communication parameters.

For example, the communication parameters may include a periodicity of uplink traffic, a periodicity of downlink traffic, an uplink transmission power, and/or a MCS, among other examples. In some aspects, the first configuration may be associated with a first maximum number of uplink data retransmissions, a first maximum number of uplink acknowledgment (ACK) retransmissions, a first delayed block ACK transmission policy, a first quality of service (QoS) configuration, and/or a first configuration for transmission of traffic of an additional communication protocol that is different from a communication protocol associated with the wireless link, among other examples.

As shown by reference number 410, the WCD may detect a trigger condition. The trigger condition may indicate that communications may be improved by using a second SI and a second SP for TWT communications with the one or more audio devices. The second SI may be different from the first SI and/or the second SP may be different from the first SP.

In some aspects, the trigger condition may include a change of a signal strength, a change of one or more concurrent wireless links on one or more frequency bands that overlap with the wireless link, a change of a use state of the WCD, and/or a change in channel congestion or interference, among other examples.

In some aspects, the change of the signal strength comprises a decreased signal strength by an amount that satisfies a first threshold. In some aspects, the second service interval is greater than the first service interval and/or the second service period is greater than the first service period based at least in part on the decreased signal strength. In some aspects, the change of the signal strength includes an increased signal strength by an amount that satisfies a second threshold. The second service interval is less than the first service interval and/or the second service period is less than the first service period based at least in part on the increased signal strength. In some aspects, the change of the signal strength includes and/or is based at least in part on a change of an average signal strength of a set of most recent signal strength values, with the change satisfying a threshold.

In some aspects, the change of the one or more concurrent wireless links on the one or more frequency bands that overlap with the wireless link includes an increase of a number of the one or more concurrent wireless links. The second service interval is greater than the first service interval and/or the second service period is less than the first service period based at least in part on the increase of the number of the one or more concurrent wireless links (or an amount of bandwidth used by existing concurrent wireless links increases). In some aspects, the change of the one or more concurrent wireless links on the one or more frequency bands that overlap with the wireless link includes a decrease of the number of the one or more concurrent wireless links. The one or more of the second service interval is less than the first service interval or the second service period is greater than the first service period based at least in part on the decrease of the number of the one or more concurrent wireless links (or an amount of bandwidth used by existing concurrent wireless links decreases). In some aspects, the one or more concurrent wireless links may have priorities that are higher than a priority of the wireless link.

In some aspects, the change of the use state of the WCD includes a change from a low-latency use state to a relaxed latency use state (e.g., a use state with a reduced latency threshold). The second service interval is greater than the first service interval and/or the second service period is greater than the first service period based at least in part on the change to the relaxed latency use state. In some aspects, the change of the use state of the WCD includes a change from a relaxed latency use state to a low-latency use state.

The second service interval is less than the first service interval and/or the second service period is less than the first service period based at least in part on a change to the low-latency use state. In some aspects, a change of use state of the WCD includes stopping of a low-latency data stream, deactivation of a screen (e.g., associated with inactivity of the WCD), and/or exiting of an application associated with the communicating during the first communication period, among other examples.

In some aspects, the change in channel congestion or interference includes an increased channel congestion or interference. The second service interval is greater than the first service interval and/or the second service period is greater than the first service period based at least in part on the increased channel congestion or interference. In some aspects, the change in channel congestion or interference includes a decreased channel congestion or interference. The second service interval is less than the first service interval or the second service period is less than the first service period based at least in part on the decreased channel congestion or interference.

In some aspects, a trigger condition may indicate to increase concurrency time, increase an SI, and/or decrease SP to support additional communication. In some aspects, a trigger condition may indicate to decrease concurrency time, increase an SI, and/or increase SP to support additional retransmissions in poor RSSI conditions or in channel congestion or interference conditions.

As shown by reference number 415, the WCD may transmit, and the one or more audio devices may receive, an indication to switch to the second SI and the second SP. In some aspects, the WCD may select the second SI and/or the second SP based at least in part on the trigger condition. For example, a reason for switching away from the first SI and the first SP may indicate to select the second SI and/or the second SP. Additionally, or alternatively, a degree to which the reason occurs (e.g., an amount of new communication via concurrent links or an amount by which RSSI drops) may indicate to select the second SI and/or the second SP.

In some aspects, the WCD may transmit the indication to switch via an unsolicited TWT response. For example, an XPAN soft access point (SAP) of the WCD may transmit an unsolicited TWT response frame (via XPAN or Bluetooth) to the one or more audio devices at a start of an upcoming TWT SI. The unsolicited TWT response frame may carry an updated offset in the TWT field.

The one or more audio devices may transmit ACKs to the unsolicited TWT response frame. The updated TWT SI and/or SP may begin starting in a subsequent TWT SI (e.g., if the unsolicited TWT response packet is ACKed and at least one subsequent downlink audio data is received by the one or more audio devices in the same SI). This supports a faster communication of the updated TWT SI and/or SP parameters for SI and SP switching, resulting in a more responsive system to condition changes with reduced latency for switching. The unsolicited TWT response does not require a tear down and renegotiation of communication parameters to reestablish a communication link, which may have otherwise been required to change an SP and SI of a TWT session.

As shown by reference number 420, the WCD and the one or more audio devices may communicate using the second SI and the second SP. In some aspects, the second service period is shorter than the first service period. The second service period may be associated with one or more communication parameters. The one or more communication parameters may include a reduced number of maximum retransmissions relative to a number of maximum retransmissions associated with communications during the first communication period, an increased minimum MCS relative to a minimum MCS associated with communications during the first communication period using the first SI and first SP, among other examples. In some aspects, the one or more communication parameters may include an increased audio compression relative to an audio compression associated with communications during the first communication period, a reduced audio bit rate relative to an audio bit rate associated with communications during the first communication period, and/or a relaxed error rate parameter relative to an error rate parameter associated with communications during the first communication period, among other examples.

In some aspects, the first service interval, the second service interval, the first service period, and the second service period are associated with the audio device (e.g., a first earbud) and an additional audio device (e.g., a second earbud). In some aspects, a third service interval and a third service period are associated with the additional audio device, the third service interval being different from the first service interval and the second service interval, or the third service period being different from the first service period and the second service period. In this way, the WCD may communicate with the additional audio device during a concurrency time associated with the audio device.

Based at least in part on the WCD having a capability to switch to the second SI and/or second SP, the WCD may use the first SI and SP when conditions permit, which may improve latency and/or spectral efficiency for the wireless connection. Additionally, or alternatively, supporting switching to the second SI and/or SP may improve a throughput and/or latency of the concurrent communications.

As indicated above, FIG. 4 is provided as an example. Other examples may differ from what is described with regard to FIG. 4.

Figure 5:
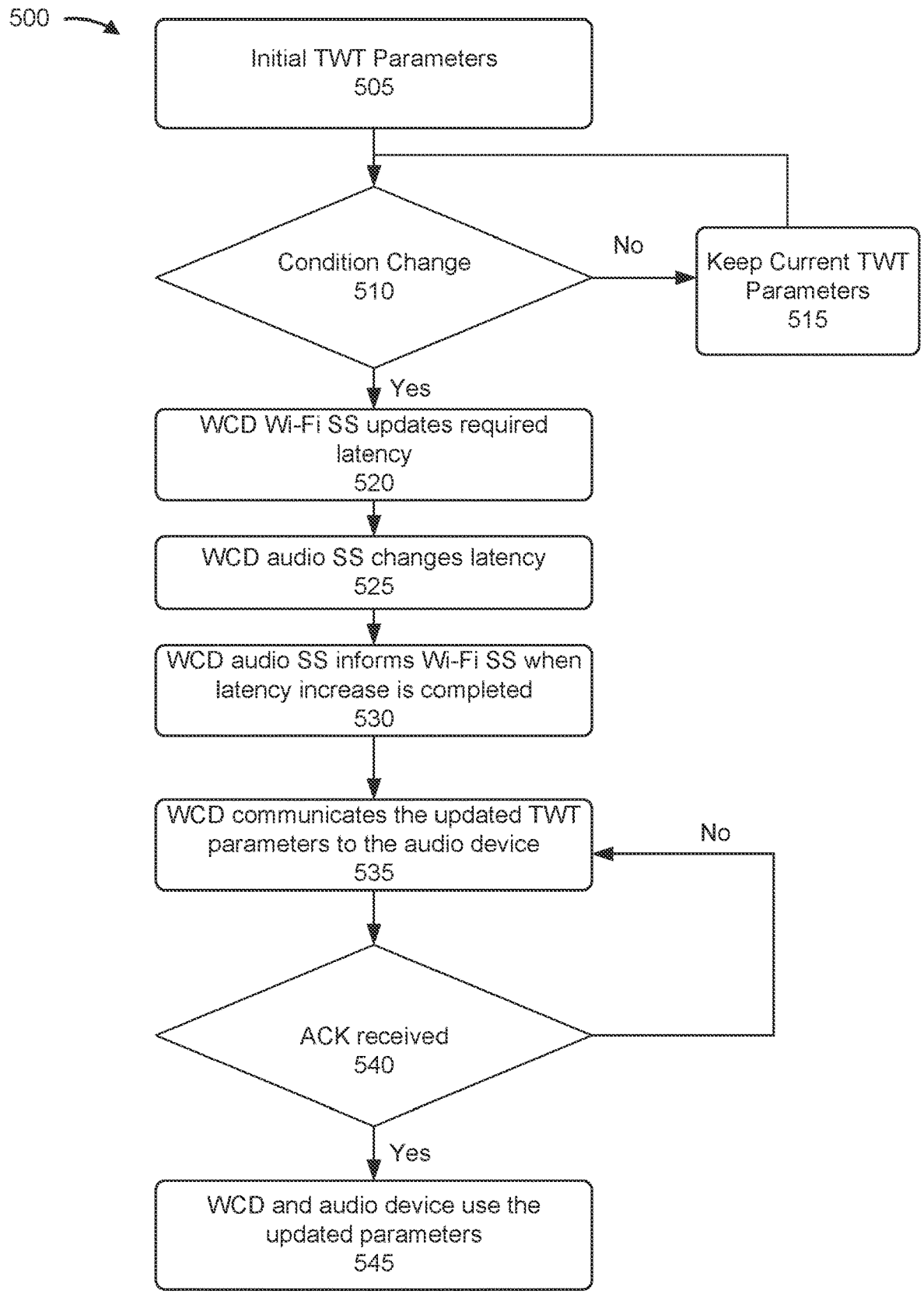
FIG. 5 is a diagram of an example associated with trigger conditions for switching service intervals and service periods, in accordance with the present disclosure.

FIG. 5 is a diagram of an example 500 associated with trigger conditions for switching service intervals and service periods, in accordance with the present disclosure. In context of FIG. 5, a WCD (e.g., a STA, a handset, a UE, or host device, among other examples) may communicate with one or more audio devices (e.g., earbuds). In some aspects, the WCD and the one or more audio devices may have established a wireless connection prior to operations shown in FIG. 5.

As shown by reference number 505, the WCD and the one or more audio devices may communicate using initial TWT parameters. For example, the TWT parameters may be a preferred or default set of parameters. In some aspects, the initial TWT parameters may include an SI (e.g., 4 ms for ULL gaming or 70 ms for lossless audio).

As shown by reference number 510, the WCD may determine if a condition changed. As described herein, the trigger may indicate that an update to the SI and/or an SP may improve communications between the WCD and the one or more audio devices or between the WCD and one or more additional devices on a same channel during a concurrency time.

As shown by reference number 515, if the condition has not changed (or has changed by an amount that fails to satisfy a threshold), the WCD may keep current TWT parameters.

As shown by reference number 520, if the condition change has occurred, a Wi-Fi sub-system (SS) of the WCD may update a required latency.

As shown by reference number 525, the Wi-Fi SS may indicate to an audio SS to change latency. For example, the audio SS may receive an indication via a connectivity proxy with an indication to adapt an audio latency.

As shown by reference number 530, the WCD audio SS may inform the Wi-Fi SS when a latency increase is complete. In some aspects, if a large latency increase is required (e.g., more than 2×), the latency increase may be performed in steps of 2× (e.g., so that the increased SP still fits with the original SI value before a next step).

As shown by reference number 535, the WCD may communicate (e.g., transmit an indication of) the updated TWT parameters to the one or more audio devices.

As shown by reference number 540, if the WCD fails to receive an ACK from the one or more audio devices, the WCD may attempt again to communicate the updated TWT parameters to the one or more audio devices.

As shown by reference number 545, if the WCD receives an ACK from the one or more audio devices, the WCD and the audio device may use the updated parameters.

As indicated above, FIG. 5 is provided as an example. Other examples may differ from what is described with regard to FIG. 5.

Figure 6:
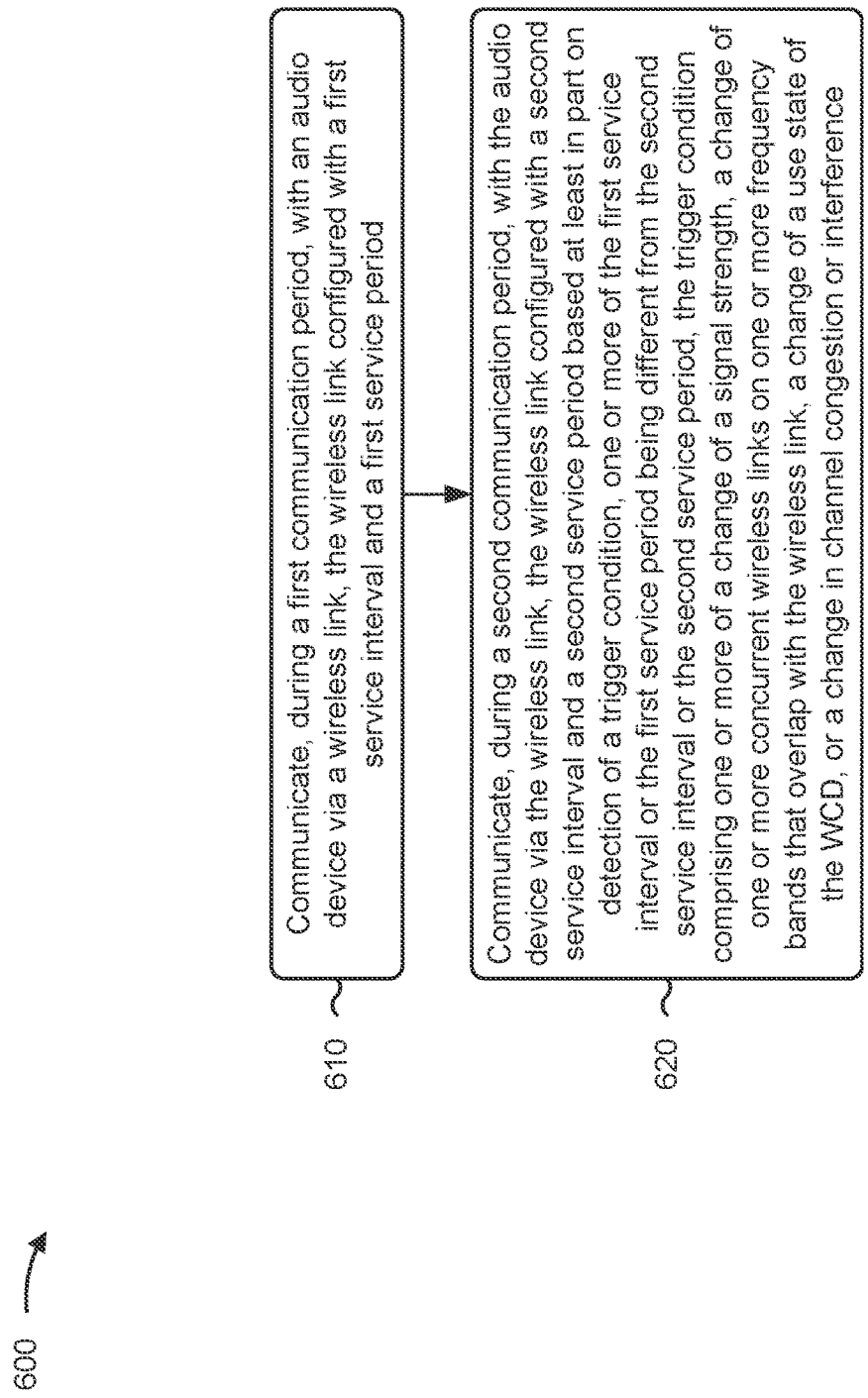
FIG. 6 is a diagram illustrating an example process performed, for example, by a wireless communication device (WCD), in accordance with the present disclosure.

FIG. 6 is a diagram illustrating an example process 600 performed, for example, by a WCD, in accordance with the present disclosure. Example process 600 is an example where the WCD (e.g., WCD 115) performs operations associated with configuration switch triggers for audio device communications.

As shown in FIG. 6, in some aspects, process 600 may include communicating, during a first communication period, with an audio device via a wireless link, the wireless link configured with a first service interval and a first service period (block 610). For example, the WCD (e.g., using communication manager 808, reception component 802, and/or transmission component 804 depicted in FIG. 8) may communicate, during a first communication period, with an audio device via a wireless link, the wireless link configured with a first service interval and a first service period, as described above.

As further shown in FIG. 6, in some aspects, process 600 may include communicating, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of: a change of a signal strength, a change of one or more concurrent wireless links on one or more frequency bands that overlap with the wireless link, a change of a use state of the WCD, or a change in channel congestion or interference (block 620). For example, the WCD (e.g., using communication manager 808, reception component 802, and/or transmission component 804 depicted in FIG. 8) may communicate, during a second communication period, with the audio device via the wireless link, the wireless link configured with a second service interval and a second service period based at least in part on detection of a trigger condition (e.g., by the audio device and/or the WCD), one or more of the first service interval or the first service period being different from the second service interval or the second service period, the trigger condition comprising one or more of: a change of a signal strength, a change of one or more concurrent wireless links on one or more frequency bands that overlap with the wireless link, a change of a use state of the WCD, or a change in channel congestion or interference, as described above.

Process 600 may include additional aspects, such as any single aspect or any combination of aspects described below and/or in connection with one or more other processes described elsewhere herein.

In a first aspect, the change of the signal strength comprises a decreased signal strength by an amount that satisfies a first threshold and one or more of the second service interval is greater than the first service interval or the second service period is greater than the first service period, or the change of the signal strength comprises an increased signal strength by an amount that satisfies a second threshold and one or more of the second service interval is less than the first service interval or the second service period is less than the first service period.

In a second aspect, alone or in combination with the first aspect, the change of the one or more concurrent wireless links on the one or more frequency bands that overlap with the wireless link comprises an increase of a number of the one or more concurrent wireless links and wherein one or more of the second service interval is greater than the first service interval or the second service period is less than the first service period, or the change of the one or more concurrent wireless links on the one or more frequency bands that overlap with the wireless link comprises a decrease of the number of the one or more concurrent wireless links and one or more of the second service interval is less than the first service interval or the second service period is greater than the first service period.

In a third aspect, alone or in combination with one or more of the first and second aspects, the change of the use state of the WCD comprises a change from a low-latency use state to a relaxed latency use state and one or more of the second service interval is greater than the first service interval or the second service period is greater than the first service period, or the change of the use state of the WCD comprises a change from a relaxed latency use state to a low-latency use state and one or more of the second service interval is less than the first service interval or the second service period is less than the first service period.

In a fourth aspect, alone or in combination with one or more of the first through third aspects, the change in channel congestion or interference comprises an increased channel congestion or interference and one or more of the second service interval is greater than the first service interval or the second service period is greater than the first service period, or the change in channel congestion or interference comprises a decreased channel congestion or interference and wherein one or more of the second service interval is less than the first service interval or the second service period is less than the first service period.

In a fifth aspect, alone or in combination with one or more of the first through fourth aspects, the change of signal strength comprises a change of an average signal strength of a set of most recent signal strength values, wherein the change satisfies a threshold.

In a sixth aspect, alone or in combination with one or more of the first through fifth aspects, the change of use state of the WCD comprises stopping of a low-latency data stream, deactivation of a screen, or exiting of an application associated with the communicating during the first communication period.

In a seventh aspect, alone or in combination with one or more of the first through sixth aspects, the first service interval, the second service interval, the first service period, and the second service period are associated with the audio device and an additional audio device, or wherein a third service interval and a third service period are associated with the additional audio device, the third service interval being different from the first service interval and the second service interval, or the third service period being different from the first service period and the second service period.

In an eighth aspect, alone or in combination with one or more of the first through seventh aspects, the second service period is shorter than the first service period, and wherein the second service period is associated with one or more of a reduced number of maximum retransmissions relative to a number of maximum retransmissions associated with communications during the first communication period, an increased minimum modulation and coding scheme (MCS) relative to a minimum MCS associated with communications during the first communication period, an increased audio compression relative to an audio compression associated with communications during the first communication period, a reduced audio bit rate relative to an audio bit rate associated with communications during the first communication period, or a relaxed error rate parameter relative to an error rate parameter associated with communications during the first communication period.

In a ninth aspect, alone or in combination with one or more of the first through eighth aspects, the one or more concurrent wireless links have priorities that are higher than a priority of the wireless link.

In a tenth aspect, alone or in combination with one or more of the first through ninth aspects, process 600 includes transmitting an indication to use the second service interval and the second service period during the second communication period.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
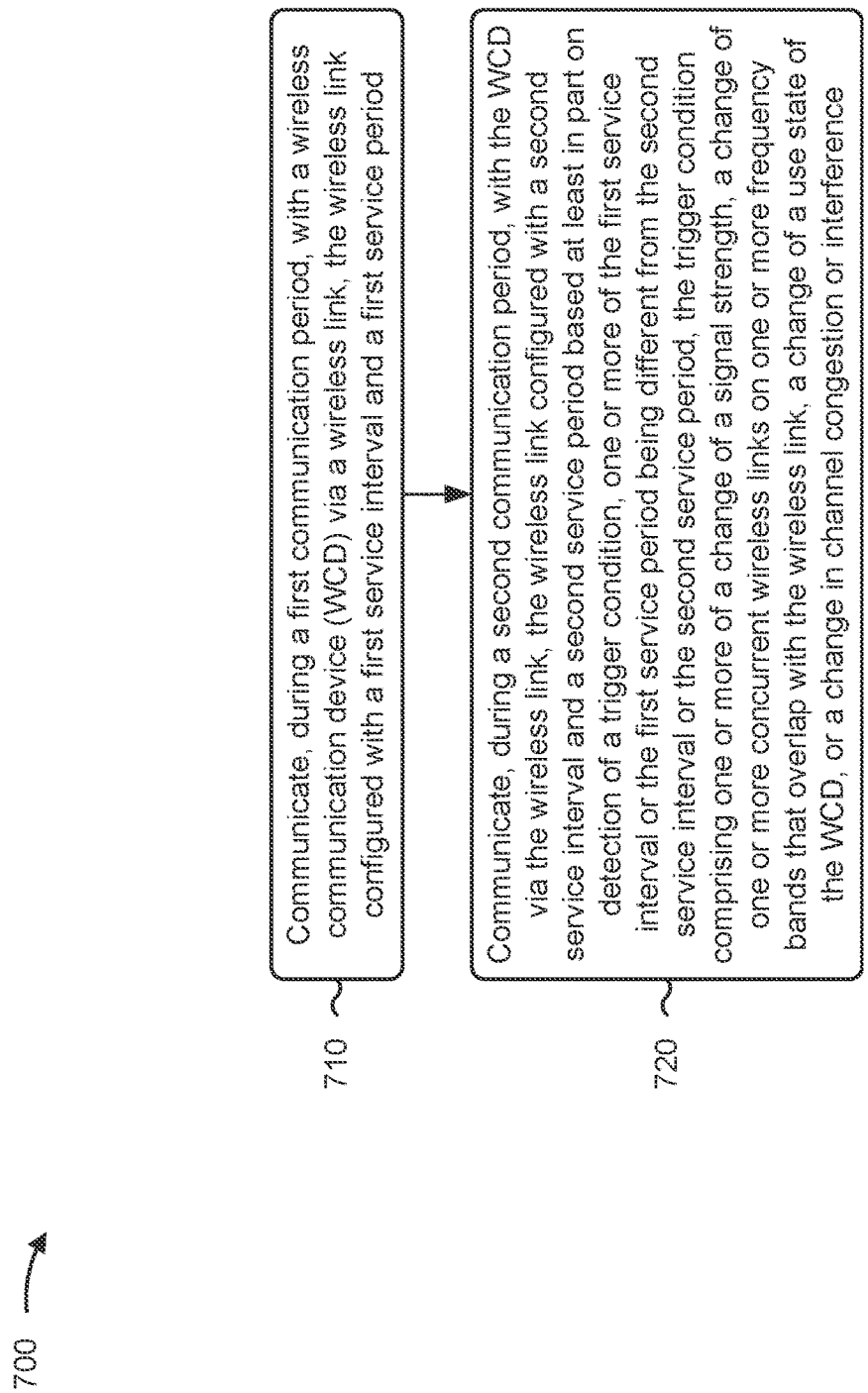
FIG. 7 is a diagram illustrating an example process performed, for example, by an audio device, in accordance with the present disclosure.

FIG. 7 is a diagram illustrating an example process 700 performed, for example, by an audio device, in accordance with the present disclosure. Example process 700 is an example where the audio device (e.g., wireless earbud 130 and/or a peripheral device) performs operations associated with configuration switch triggers for audio device communications.

As shown in FIG. 7, in some aspects, process 700 may include communicating, during a first communication period, with a WCD via a wireless link, the wireless link configured with a first service interval and a first service period (block 710). For example, the audio (e.g., using communication manager 908, reception component 902, and/or transmission component 904 depicted in FIG. 9) may communicate, during a first communication period, with a WCD via a wireless link, the wireless link configured with a first service interval and a first service period, as described above.

As further shown in FIG. 7, in some aspects, process 700 may include communicating, during a second communication period, with the WCD via the wireless link, the wireless link configured with a second service interval and a second service period based at least in part on detection of a trigger condition (e.g., by the audio device and/or the WCD), one or more of the first service interval or the first service period being different from the second service interval or the second service period, the trigger condition comprising one or more of: a change of a signal strength, a change of one or more concurrent wireless links on one or more frequency bands that overlap with the wireless link, a change of a use state of the WCD, or a change in channel congestion or interference (block 720). For example, the audio device (e.g., using communication manager 908, reception component 902, and/or transmission component 904 depicted in FIG. 9) may communicate, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of: a change of a signal strength, a change of one or more concurrent wireless links on one or more frequency bands that overlap with the wireless link, a change of a use state of the WCD, or a change in channel congestion or interference, as described above.

Process 700 may include additional aspects, such as any single aspect or any combination of aspects described below and/or in connection with one or more other processes described elsewhere herein.

In a first aspect, the change of the signal strength comprises a decreased signal strength by an amount that satisfies a first threshold and one or more of the second service interval is greater than the first service interval or the second service period is greater than the first service period, or the change of the signal strength comprises an increased signal strength by an amount that satisfies a second threshold and one or more of the second service interval is less than the first service interval or the second service period is less than the first service period.

In a second aspect, alone or in combination with the first aspect, the change of the one or more concurrent wireless links on the one or more frequency bands that overlap with the wireless link comprises an increase of a number of the one or more concurrent wireless links and wherein one or more of the second service interval is greater than the first service interval or the second service period is less than the first service period, or the change of the one or more concurrent wireless links on the one or more frequency bands that overlap with the wireless link comprises a decrease of the number of the one or more concurrent wireless links and one or more of the second service interval is less than the first service interval or the second service period is greater than the first service period.

In a third aspect, alone or in combination with one or more of the first and second aspects, the change of the use state of the WCD comprises a change from a low-latency use state to a relaxed latency use state and one or more of the second service interval is greater than the first service interval or the second service period is greater than the first service period, or the change of the use state of the WCD comprises a change from a relaxed latency use state to a low-latency use state and one or more of the second service interval is less than the first service interval or the second service period is less than the first service period.

In a fourth aspect, alone or in combination with one or more of the first through third aspects, the change in channel congestion or interference comprises an increased channel congestion or interference and one or more of the second service interval is greater than the first service interval or the second service period is greater than the first service period, or the change in channel congestion or interference comprises a decreased channel congestion or interference and wherein one or more of the second service interval is less than the first service interval or the second service period is less than the first service period.

In a fifth aspect, alone or in combination with one or more of the first through fourth aspects, the change of signal strength comprises a change of an average signal strength of a set of most recent signal strength values, wherein the change satisfies a threshold.

In a sixth aspect, alone or in combination with one or more of the first through fifth aspects, the change of use state of the WCD comprises stopping of a low-latency data stream, deactivation of a screen, or exiting of an application associated with the communicating during the first communication period.

In a seventh aspect, alone or in combination with one or more of the first through sixth aspects, the first service interval, the second service interval, the first service period, and the second service period are associated with the audio device and an additional audio device, or wherein a third service interval and a third service period are associated with the additional audio device, the third service interval being different from the first service interval and the second service interval, or the third service period being different from the first service period and the second service period.

In an eighth aspect, alone or in combination with one or more of the first through seventh aspects, the second service period is shorter than the first service period, and wherein the second service period is associated with one or more of a reduced number of maximum retransmissions relative to a number of maximum retransmissions associated with communications during the first communication period, an increased minimum MCS relative to a minimum MCS associated with communications during the first communication period, an increased audio compression relative to an audio compression associated with communications during the first communication period, a reduced audio bit rate relative to an audio bit rate associated with communications during the first communication period, or a relaxed error rate parameter relative to an error rate parameter associated with communications during the first communication period.

In a ninth aspect, alone or in combination with one or more of the first through eighth aspects, the one or more concurrent wireless links have priorities that are higher than a priority of the wireless link.

In a tenth aspect, alone or in combination with one or more of the first through ninth aspects, process 700 includes receiving an indication to use the second service interval and the second service period during the second communication period.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
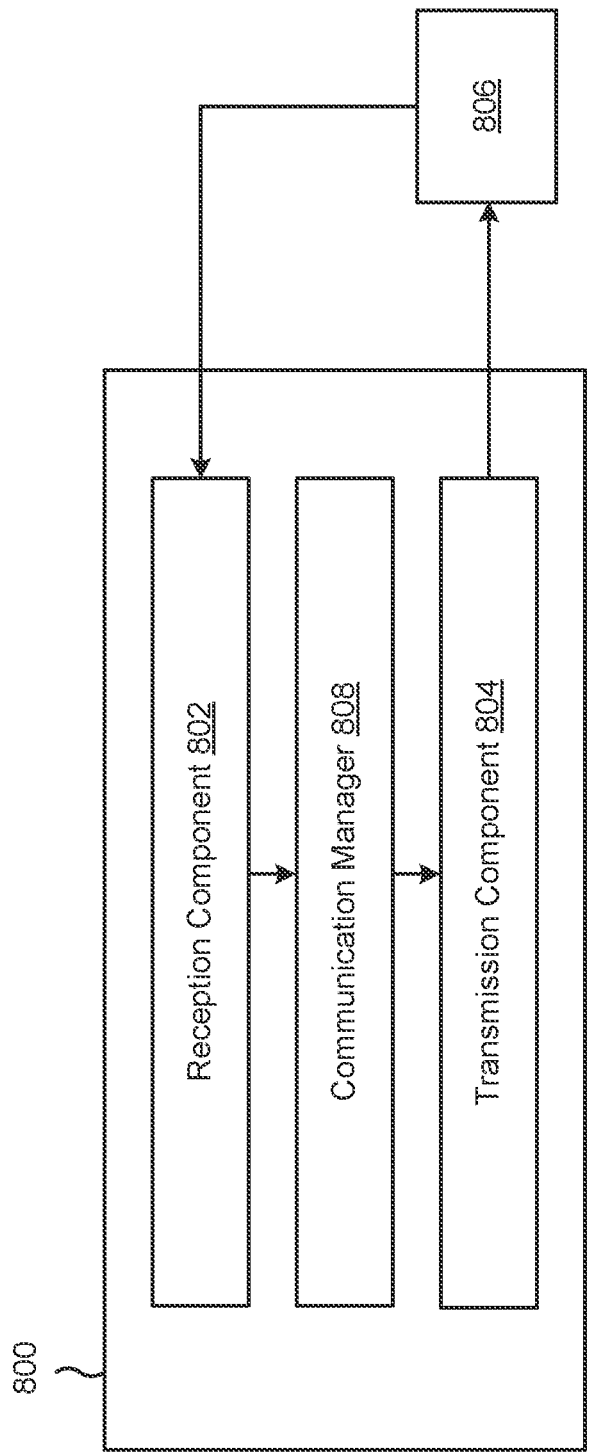
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a WCD, or a WCD may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a peripheral device, an earbud, an audio device, and/or another wireless communication device) using the reception component 802 and the transmission component 804. As further shown, the apparatus 800 may include a communication manager 808.

In some aspects, the apparatus 800 may be configured to perform one or more operations described herein. Additionally, or alternatively, the apparatus 800 may be configured to perform one or more processes described herein, such as process 600 of FIG. 6. In some aspects, the apparatus 800 and/or one or more components shown in FIG. 8 may include one or more components of the WCD described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a multiple-input multiple-output (MIMO) detector, a receive processor, a controller/processor, a memory, or a combination thereof, of the WCD described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the WCD described in connection with FIG. 2. In some aspects, the transmission component 804 may be co-located with the reception component 802 in a transceiver.

The communication manager 808, reception component 802, and/or transmission component 804 may communicate, during a first communication period, with an audio device via a wireless link, the wireless link configured with a first service interval and a first service period. The communication manager 808, reception component 802, and/or transmission component 804 may communicate, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of a change of a signal strength, a change of one or more concurrent wireless links on one or more frequency bands that overlap with the wireless link, a change of a use state of the WCD, or a change in channel congestion or interference.

The transmission component 804 may transmit an indication to use the second service interval and the second service period during the second communication period.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
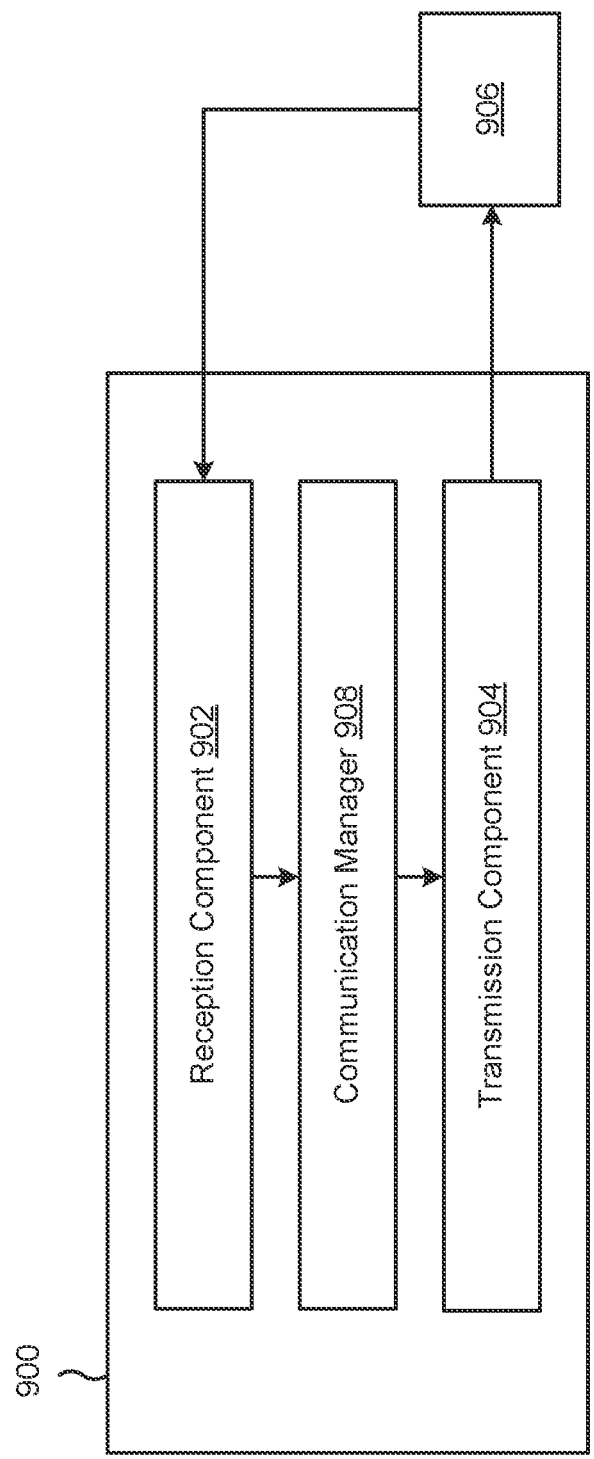
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be an audio device, or an audio device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein. Additionally, or alternatively, the apparatus 900 may be configured to perform one or more processes described herein, such as process 700 of FIG. 7. In some aspects, the apparatus 900 and/or one or more components shown in FIG. 9 may include one or more components of the audio device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the audio device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the audio device described in connection with FIG. 2. In some aspects, the transmission component 904 may be co-located with the reception component 902 in a transceiver.

The communication manager 908, reception component 902, and/or transmission component 904 may communicate, during a first communication period, with a WCD via a wireless link, the wireless link configured with a first service interval and a first service period. The communication manager 908, reception component 902, and/or transmission component 904 may communicate, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of a change of a signal strength, a change of one or more concurrent wireless links on one or more frequency bands that overlap with the wireless link, a change of a use state of the WCD, or a change in channel congestion or interference.

The reception component 902 may receive an indication to use the second service interval and the second service period during the second communication period.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a wireless communication device (WCD), comprising: communicating, during a first communication period, with an audio device via a wireless link, the wireless link configured with a first service interval and a first service period; and communicating, during a second communication period, with the audio device via the wireless link, the wireless link configured with a second service interval and a second service period based at least in part on detection of a trigger condition, one or more of the first service interval or the first service period being different from the second service interval or the second service period, the trigger condition comprising one or more of: a change of a signal strength, a change of one or more concurrent wireless links on one or more frequency bands that overlap with the wireless link, a change of a use state of the WCD, or a change in channel congestion or interference.

Aspect 2: The method of Aspect 1, wherein the change of the signal strength comprises a decreased signal strength by an amount that satisfies a threshold, and wherein one or more of the second service interval is greater than the first service interval or the second service period is greater than the first service period.

Aspect 3: The method of any of Aspects 1-2, wherein the change of the one or more concurrent wireless links on the one or more frequency bands that overlap with the wireless link comprises an increase of a number of the one or more concurrent wireless links, and wherein one or more of the second service interval is greater than the first service interval or the second service period is less than the first service period.

Aspect 4: The method of any of Aspects 1-3, wherein the change of the use state of the WCD comprises a change from a low-latency use state to a relaxed latency use state, and wherein one or more of the second service interval is greater than the first service interval or the second service period is less than the first service period.

Aspect 5: The method of any of Aspects 1-4, wherein the change in channel congestion or interference comprises an increased channel congestion or interference, and wherein one or more of the second service interval is greater than the first service interval or the second service period is greater than the first service period.

Aspect 6: The method of any of Aspects 1-5, wherein the change of signal strength comprises: a change of an average signal strength of a set of most recent signal strength values, wherein the change satisfies a threshold.

Aspect 7: The method of any of Aspects 1-6, wherein the change of use state of the WCD comprises: stopping of a low-latency data stream, deactivation of a screen, or exiting of an application associated with the communicating during the first communication period.

Aspect 8: The method of any of Aspects 1-7, wherein the first service interval, the second service interval, the first service period, and the second service period are associated with the audio device and an additional audio device, or wherein a third service interval and a third service period are associated with the additional audio device, the third service interval being different from the first service interval and the second service interval, or the third service period being different from the first service period and the second service period.

Aspect 9: The method of any of Aspects 1-8, wherein the second service period is shorter than the first service period, and wherein the second service period is associated with one or more of: a reduced number of maximum retransmissions relative to a number of maximum retransmissions associated with communications during the first communication period, an increased minimum modulation and coding scheme (MCS) relative to a minimum MCS associated with communications during the first communication period, an increased audio compression relative to an audio compression associated with communications during the first communication period, a reduced audio bit rate relative to an audio bit rate associated with communications during the first communication period, or a relaxed error rate parameter relative to an error rate parameter associated with communications during the first communication period.

Aspect 10: The method of any of Aspects 1-9, wherein the one or more concurrent wireless links have priorities that are higher than a priority of the wireless link.

Aspect 11: The method of any of Aspects 1-10, further comprising: transmitting an indication to use the second service interval and the second service period during the second communication period.

Aspect 12: A method of wireless communication performed by an audio device, comprising: communicating, during a first communication period, with a wireless communication device (WCD) via a wireless link, the wireless link configured with a first service interval and a first service period; and communicating, during a second communication period, with the WCD via the wireless link, the wireless link configured with a second service interval and a second service period based at least in part on detection of a trigger condition, one or more of the first service interval or the first service period being different from the second service interval or the second service period, the trigger condition comprising one or more of: a change of a signal strength, a change of one or more concurrent wireless links on one or more frequency bands that overlap with the wireless link, a change of a use state of the WCD, or a change in channel congestion or interference.

Aspect 13: The method of any of Aspects 12, wherein the change of the signal strength comprises a decreased signal strength by an amount that satisfies a threshold, and wherein one or more of the second service interval is greater than the first service interval or the second service period is greater than the first service period.

Aspect 14: The method of any of Aspects 12-13, wherein the change of the one or more concurrent wireless links on the one or more frequency bands that overlap with the wireless link comprises an increase of a number of the one or more concurrent wireless links, and wherein one or more of the second service interval is greater than the first service interval or the second service period is less than the first service period.

Aspect 15: The method of any of Aspects 12-14, wherein the change of the use state of the WCD comprises a change from a low-latency use state to a relaxed latency use state, and wherein one or more of the second service interval is greater than the first service interval or the second service period is less than the first service period.

Aspect 16: The method of any of Aspects 12-15, wherein the change in channel congestion or interference comprises an increased channel congestion or interference, and wherein one or more of the second service interval is greater than the first service interval or the second service period is greater than the first service period.

Aspect 17: The method of any of Aspects 12-16, wherein the change of signal strength comprises: a change of an average signal strength of a set of most recent signal strength values, wherein the change satisfies a threshold.

Aspect 18: The method of any of Aspects 12-17, wherein the change of use state of the WCD comprises: stopping of a low-latency data stream, deactivation of a screen, or exiting of an application associated with the communicating during the first communication period.

Aspect 19: The method of any of Aspects 12-18, wherein the first service interval, the second service interval, the first service period, and the second service period are associated with the audio device and an additional audio device, or wherein a third service interval and a third service period are associated with the additional audio device, the third service interval being different from the first service interval and the second service interval, or the third service period being different from the first service period and the second service period.

Aspect 20: The method of any of Aspects 12-19, wherein the second service period is shorter than the first service period, and wherein the second service period is associated with one or more of: a reduced number of maximum retransmissions relative to a number of maximum retransmissions associated with communications during the first communication period, an increased minimum modulation and coding scheme (MCS) relative to a minimum MCS associated with communications during the first communication period, an increased audio compression relative to an audio compression associated with communications during the first communication period, a reduced audio bit rate relative to an audio bit rate associated with communications during the first communication period, or a relaxed error rate parameter relative to an error rate parameter associated with communications during the first communication period.

Aspect 21: The method of any of Aspects 12-20, wherein the one or more concurrent wireless links have priorities that are higher than a priority of the wireless link.

Aspect 22: The method of any of Aspects 12-21, further comprising: receiving an indication to use the second service interval and the second service period during the second communication period.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device (WCD) for wireless communication, comprising:
   one or more memories; and
   one or more processors, coupled to the one or more memories, the one or more processors individually or collectively configured to cause the WCD to:
   communicate, during a first communication period, with an audio device via a wireless link, the wireless link configured with a first service interval and a first service period, wherein the first service interval and the first service period are in accordance with a latency requirement of the audio device; and
   communicate, during a second communication period, with the audio device via the wireless link, the wireless link configured with a second service interval and a second service period based at least in part on detection of a trigger condition, one or more of the first service interval or the first service period being different from the second service interval or the second service period, wherein the second service interval and the second service period are in accordance with the latency requirement of the audio device, the trigger condition comprising one or more of:
   a change of a signal strength,
   a change of one or more concurrent wireless links on one or more frequency bands that overlap with the wireless link,
   a change of a use state of the WCD, or
   a change in channel congestion or interference.

2. The WCD of claim 1,
wherein the change of the signal strength comprises a decreased signal strength by an amount that satisfies a first threshold and wherein one or more of the second service interval is greater than the first service interval or the second service period is greater than the first service period, or
wherein the change of the signal strength comprises an increased signal strength by an amount that satisfies a second threshold and wherein one or more of the second service interval is less than the first service interval or the second service period is less than the first service period.

3. The WCD of claim 1,
wherein the change of the one or more concurrent wireless links on the one or more frequency bands that overlap with the wireless link comprises an increase of a number of the one or more concurrent wireless links and wherein one or more of the second service interval is greater than the first service interval or the second service period is less than the first service period,
wherein the change of the one or more concurrent wireless links on the one or more frequency bands that overlap with the wireless link comprises a decrease of the number of the one or more concurrent wireless links and wherein one or more of the second service interval is less than the first service interval or the second service period is greater than the first service period.

4. The WCD of claim 1,
wherein the change of the use state of the WCD comprises a change from a low-latency use state to a relaxed latency use state and wherein one or more of the second service interval is greater than the first service interval or the second service period is greater than the first service period, or
wherein the change of the use state of the WCD comprises a change from a relaxed latency use state to a low-latency use state and wherein one or more of the second service interval is less than the first service interval or the second service period is less than the first service period.

5. The WCD of claim 1,
wherein the change in channel congestion or interference comprises an increased channel congestion or interference and wherein one or more of the second service interval is greater than the first service interval or the second service period is greater than the first service period, or
  wherein the change in channel congestion or interference comprises a decreased channel congestion or interference and wherein one or more of the second service interval is less than the first service interval or the second service period is less than the first service period.

6. The WCD of claim 1,
wherein the change of signal strength comprises a change of an average signal strength of a set of most recent signal strength values,
  wherein the change satisfies a threshold.

7. The WCD of claim 1,
wherein the change of use state of the WCD comprises:
  stopping of a low-latency data stream,
    deactivation of a screen, or
    exiting of an application associated with the communicating during the first communication period.

8. The WCD of claim 1,
wherein the first service interval, the second service interval, the first service period, and the second service period are associated with the audio device and an additional audio device, or
  wherein a third service interval and a third service period are associated with the additional audio device, the third service interval being different from the first service interval and the second service interval, or the third service period being different from the first service period and the second service period.

9. The WCD of claim 1,
wherein the second service period is shorter than the first service period, and
  wherein the second service period is associated with one or more of:
    a reduced number of maximum retransmissions relative to a number of maximum retransmissions associated with communications during the first communication period,
    an increased minimum modulation and coding scheme (MCS) relative to a minimum MCS associated with communications during the first communication period,
    an increased audio compression relative to an audio compression associated with communications during the first communication period,
    a reduced audio bit rate relative to an audio bit rate associated with communications during the first communication period, or
    a relaxed error rate parameter relative to an error rate parameter associated with communications during the first communication period.

10. The WCD of claim 1,
wherein the one or more concurrent wireless links have priorities that are higher than a priority of the wireless link.

11. The WCD of claim 1,
wherein the one or more processors are further configured to:
  transmit an indication to use the second service interval and the second service period during the second communication period.

12. An audio device for wireless communication, comprising:
  a one or more memories; and
  one or more processors, coupled to the one or more memories, the one or more processors individually or collectively configured to cause the audio device to:
    communicate, during a first communication period, with a wireless communication device (WCD) via a wireless link, the wireless link configured with a first service interval and a first service period, wherein the first service interval and the first service period are in accordance with a latency requirement of the audio device; and
    communicate, during a second communication period, with the WCD via the wireless link, the wireless link configured with a second service interval and a second service period based at least in part on detection of a trigger condition, one or more of the first service interval or the first service period being different from the second service interval or the second service period, wherein the second service interval and the second service period are in accordance with the latency requirement of the audio device, the trigger condition comprising one or more of:
      a change of a signal strength,
      a change of one or more concurrent wireless links on one or more frequency bands that overlap with the wireless link,
      a change of a use state of the WCD, or
      a change in channel congestion or interference.

13. The audio device of claim 12,
wherein the change of the signal strength comprises a decreased signal strength by an amount that satisfies a first threshold and wherein one or more of the second service interval is greater than the first service interval or the second service period is greater than the first service period, or
  wherein the change of the signal strength comprises an increased signal strength by an amount that satisfies a second threshold and wherein one or more of the second service interval is less than the first service interval or the second service period is less than the first service period.

14. The audio device of claim 12,
wherein the change of the one or more concurrent wireless links on the one or more frequency bands that overlap with the wireless link comprises an increase of a number of the one or more concurrent wireless links and wherein one or more of the second service interval is greater than the first service interval or the second service period is less than the first service period,
  wherein the change of the one or more concurrent wireless links on the one or more frequency bands that overlap with the wireless link comprises a decrease of the number of the one or more concurrent wireless links and wherein one or more of the second service interval is less than the first service interval or the second service period is greater than the first service period.

15. The audio device of claim 12,
wherein the change of the use state of the WCD comprises a change from a low-latency use state to a relaxed latency use state and wherein one or more of the second service interval is greater than the first service interval or the second service period is greater than the first service period, or
  wherein the change of the use state of the WCD comprises a change from a relaxed latency use state to a low-latency use state and wherein one or more of the second service interval is less than the first service interval or the second service period is less than the first service period.

16. The audio device of claim 12,
wherein the change in channel congestion or interference comprises an increased channel congestion or interference and wherein one or more of the second service interval is greater than the first service interval or the second service period is greater than the first service period, or
wherein the change in channel congestion or interference comprises a decreased channel congestion or interference and wherein one or more of the second service interval is less than the first service interval or the second service period is less than the first service period.

17. The audio device of claim 12,
wherein the change in channel congestion or interference comprises an increased channel congestion or interference, and
wherein one or more of the second service interval is greater than the first service interval or the second service period is greater than the first service period.

18. The audio device of claim 12,
wherein the change of signal strength comprises a change of an average signal strength of a set of most recent signal strength values,
wherein the change satisfies a threshold.

19. The audio device of claim 12,
wherein the change of use state of the WCD comprises:
stopping of a low-latency data stream,
deactivation of a screen, or
exiting of an application associated with the communicating during the first communication period.

20. The audio device of claim 12,
wherein the first service interval, the second service interval, the first service period, and the second service period are associated with the audio device and an additional audio device, or
wherein a third service interval and a third service period are associated with the additional audio device, the third service interval being different from the first service interval and the second service interval, or the third service period being different from the first service period and the second service period.

21. The audio device of claim 12,
wherein the second service period is shorter than the first service period, and
wherein the second service period is associated with one or more of:
a reduced number of maximum retransmissions relative to a number of maximum retransmissions associated with communications during the first communication period,
an increased minimum modulation and coding scheme (MCS) relative to a minimum MCS associated with communications during the first communication period,
an increased audio compression relative to an audio compression associated with communications during the first communication period,
a reduced audio bit rate relative to an audio bit rate associated with communications during the first communication period, or
a relaxed error rate parameter relative to an error rate parameter associated with communications during the first communication period.

22. The audio device of claim 12,
wherein the one or more concurrent wireless links have priorities that are higher than a priority of the wireless link.

23. The audio device of claim 12,
wherein the one or more processors are further configured to:
receive an indication to use the second service interval and the second service period during the second communication period.

24. A method of wireless communication performed by a wireless communication device (WCD), comprising:
communicating, during a first communication period, with an audio device via a wireless link, the wireless link configured with a first service interval and a first service period, wherein the first service interval and the first service period are in accordance with a latency requirement of the audio device; and
communicating, during a second communication period, with the audio device via the wireless link, the wireless link configured with a second service interval and a second service period based at least in part on detection of a trigger condition, one or more of the first service interval or the first service period being different from the second service interval or the second service period, wherein the second service interval and the second service period are in accordance with the latency requirement of the audio device, the trigger condition comprising one or more of:
a change of a signal strength,
a change of one or more concurrent wireless links on one or more frequency bands that overlap with the wireless link,
a change of a use state of the WCD, or
a change in channel congestion or interference.

25. The method of claim 24,
wherein the change of the signal strength comprises a decreased signal strength by an amount that satisfies a first threshold and wherein one or more of the second service interval is greater than the first service interval or the second service period is greater than the first service period, or
wherein the change of the signal strength comprises an increased signal strength by an amount that satisfies a second threshold and wherein one or more of the second service interval is less than the first service interval or the second service period is less than the first service period.

26. The method of claim 24,
wherein the change of the one or more concurrent wireless links on the one or more frequency bands that overlap with the wireless link comprises an increase of a number of the one or more concurrent wireless links and wherein one or more of the second service interval is greater than the first service interval or the second service period is less than the first service period,
wherein the change of the one or more concurrent wireless links on the one or more frequency bands that overlap with the wireless link comprises a decrease of the number of the one or more concurrent wireless links and wherein one or more of the second service interval is less than the first service interval or the second service period is greater than the first service period.

27. The method of claim 24,
wherein the change of the use state of the WCD comprises a change from a low-latency use state to a relaxed latency use state and wherein one or more of the second service interval is greater than the first service interval or the second service period is greater than the first service period, or
  wherein the change of the use state of the WCD comprises a change from a relaxed latency use state to a low-latency use state and wherein one or more of the second service interval is less than the first service interval or the second service period is less than the first service period.

28. A method of wireless communication performed by an audio device, comprising:
  communicating, during a first communication period, with a wireless communication device (WCD) via a wireless link, the wireless link configured with a first service interval and a first service period, wherein the first service interval and the first service period are in accordance with a latency requirement of the audio device; and
  communicating, during a second communication period, with the WCD via the wireless link, the wireless link configured with a second service interval and a second service period based at least in part on detection of a trigger condition, one or more of the first service interval or the first service period being different from the second service interval or the second service period, wherein the second service interval and the second service period are in accordance with the latency requirement of the audio device, the trigger condition comprising one or more of:
    a change of a signal strength,
    a change of one or more concurrent wireless links on one or more frequency bands that overlap with the wireless link,
    a change of a use state of the WCD, or
    a change in channel congestion or interference.

29. The method of claim 28,
wherein the change in channel congestion or interference comprises an increased channel congestion or interference and wherein one or more of the second service interval is greater than the first service interval or the second service period is greater than the first service period, or
  wherein the change in channel congestion or interference comprises a decreased channel congestion or interference and wherein one or more of the second service interval is less than the first service interval or the second service period is less than the first service period.

30. The method of claim 28,
wherein the change in channel congestion or interference comprises an increased channel congestion or interference, and
  wherein one or more of the second service interval is greater than the first service interval or the second service period is greater than the first service period.

* * * * *